United States Patent
Naik et al.

(10) Patent No.: US 12,072,100 B1
(45) Date of Patent: Aug. 27, 2024

(54) COMBUSTOR FOR A GAS TURBINE ENGINE

(71) Applicant: General Electric Company, Schenectady, NY (US)

(72) Inventors: Pradeep Naik, Bengaluru (IN); Shai Birmaher, Cincinnati, OH (US); Saket Singh, Bengaluru (IN); Narasimhan Suresh Sahana, Bengaluru (IN); Kwanwoo Kim, Cincinnati, OH (US)

(73) Assignee: GENERAL ELECTRIC COMPANY, Cincinnati, OH (US)

( * ) Notice: Subject to any disclaimer, the term of this patent is extended or adjusted under 35 U.S.C. 154(b) by 0 days.

(21) Appl. No.: 18/503,751

(22) Filed: Nov. 7, 2023

(51) Int. Cl.
 *F23R 3/14* (2006.01)
 *F02C 3/30* (2006.01)
 *F23R 3/00* (2006.01)
 *F23R 3/16* (2006.01)

(52) U.S. Cl.
 CPC .......... *F23R 3/14* (2013.01); *F02C 3/30* (2013.01); *F23R 3/002* (2013.01); *F23R 3/16* (2013.01)

(58) Field of Classification Search
 CPC .... F23R 3/002; F23R 3/10; F23R 3/12; F23R 3/16; F02C 3/30
 See application file for complete search history.

(56) References Cited

U.S. PATENT DOCUMENTS

| | | | | |
|---|---|---|---|---|
| 3,747,336 A * | 7/1973 | Dibelius | .................. | F02C 3/305 |
| | | | | 60/39.55 |
| 3,780,529 A | 12/1973 | Johnson | | |
| 4,631,914 A * | 12/1986 | Hines | .................. | F02C 9/18 |
| | | | | 60/39.55 |
| 4,893,468 A * | 1/1990 | Hines | .................. | F02C 3/30 |
| | | | | 60/762 |
| 4,893,469 A * | 1/1990 | Yamashita | ............ | F01K 21/047 |
| | | | | 60/649 |
| 4,982,564 A * | 1/1991 | Hines | .................. | F02C 7/141 |
| | | | | 60/39.55 |
| 5,012,645 A * | 5/1991 | Reynolds | .................. | F23R 3/10 |
| | | | | 60/754 |
| 5,054,279 A * | 10/1991 | Hines | .................. | F01K 21/047 |
| | | | | 60/39.5 |
| 5,174,105 A * | 12/1992 | Hines | .................. | F02C 3/10 |
| | | | | 60/774 |
| 5,490,389 A * | 2/1996 | Harrison | .................. | F23R 3/10 |
| | | | | 60/737 |

(Continued)

FOREIGN PATENT DOCUMENTS

| | | | | |
|---|---|---|---|---|
| CA | 2844675 A1 * | 9/2014 | ............. | F23R 3/002 |
| EP | 1788310 A2 * | 5/2007 | ............... | F23R 3/04 |
| EP | 3376111 B1 | 4/2021 | | |

*Primary Examiner* — Craig Kim
(74) *Attorney, Agent, or Firm* — Venable LLP; Edward A. Kmett; Michele V. Frank

(57) ABSTRACT

A combustor for an aircraft gas turbine engine includes a dome structure, a swirler assembly connected to the dome structure, and a cowl connected to the dome structure and defining a plenum between the dome structure and the cowl, and surrounding the swirler assembly. The cowl includes an airflow opening through an upstream wall portion of the cowl for providing a flow of compressed air into the plenum. In addition, the cowl includes a cowl steam channel therewithin and a plurality of steam injection nozzles that provide a flow of steam from the cowl steam channel into the plenum.

20 Claims, 19 Drawing Sheets

(56) References Cited

U.S. PATENT DOCUMENTS

| | | | | |
|---|---|---|---|---|
| 5,497,611 | A * | 3/1996 | Benz | F23R 3/02 |
| | | | | 60/776 |
| 5,628,193 | A * | 5/1997 | Kington | F01D 9/023 |
| | | | | 60/752 |
| 5,896,740 | A | 4/1999 | Shouman | |
| 6,311,471 | B1 * | 11/2001 | Waldherr | F23R 3/283 |
| | | | | 60/39.55 |
| 6,715,295 | B2 * | 4/2004 | Gadde | F02C 3/30 |
| | | | | 60/39.55 |
| 8,387,358 | B2 * | 3/2013 | Danis | F23R 3/50 |
| | | | | 60/39.53 |
| 8,567,199 | B2 * | 10/2013 | Barton | F23L 7/00 |
| | | | | 431/162 |
| 8,813,473 | B2 | 8/2014 | Fletcher et al. | |
| 9,310,082 | B2 * | 4/2016 | Kraemer | F23R 3/14 |
| 10,088,160 | B2 * | 10/2018 | Koganezawa | F23L 7/005 |
| 10,619,856 | B2 | 4/2020 | McCormick et al. | |
| 10,712,002 | B2 * | 7/2020 | Masquelet | F23R 3/283 |
| 10,982,852 | B2 | 4/2021 | Sauer et al. | |
| 10,995,956 | B2 * | 5/2021 | Kajimura | F23R 3/50 |
| 11,280,495 | B2 | 3/2022 | Gandikota et al. | |
| 11,428,412 | B2 | 8/2022 | Tentorio et al. | |
| 11,603,798 | B1 * | 3/2023 | Terwilliger | F02C 7/18 |
| 11,739,935 | B1 * | 8/2023 | Kahn | F23R 3/283 |
| | | | | 60/756 |
| 11,920,792 | B1 * | 3/2024 | Boardman | F23R 3/286 |
| 2014/0060063 | A1 * | 3/2014 | Boardman | F23R 3/286 |
| | | | | 60/737 |
| 2023/0104395 | A1 * | 4/2023 | Naik | F23R 3/28 |
| | | | | 60/737 |

* cited by examiner

COMBUSTOR FOR A GAS TURBINE ENGINE

TECHNICAL FIELD

The present disclosure relates to a combustor for a gas turbine engine.

BACKGROUND

A combustor generally includes a swirler that provides a flow of swirled air mixed with fuel into a combustion chamber, where the fuel and air mixture is ignited and burned. The burning of the fuel and air mixture in the combustion chamber results in carbon monoxide (CO) and nitrous oxide (NOx) emissions from the combustor. One technique to attempt to reduce the CO and the NOx emissions is to inject steam or water directly into the swirler via, for example, a fuel nozzle, to mix with the fuel and air mixture.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

DETAILED DESCRIPTION

Figure 1:
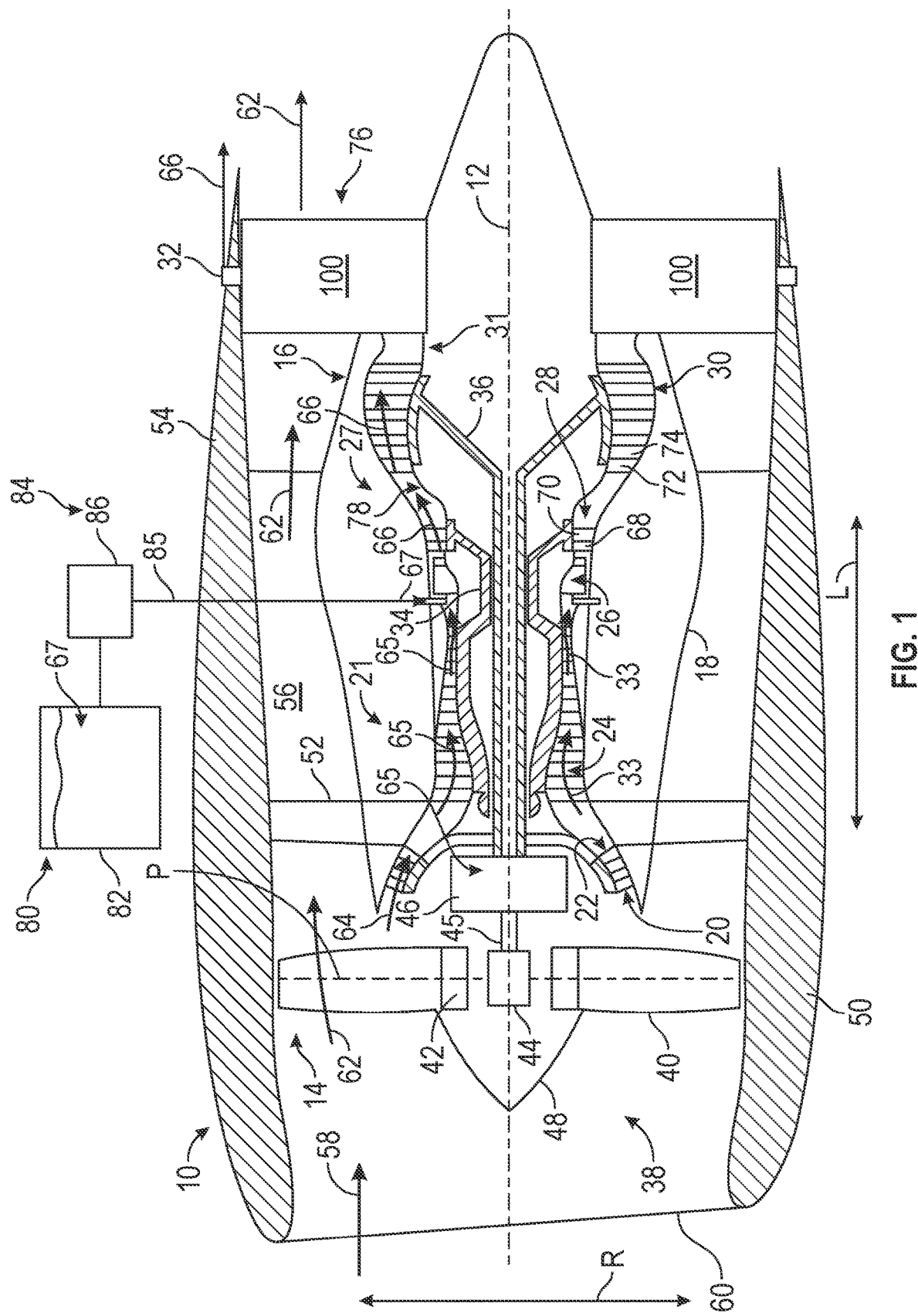
FIG. 1 is a schematic partial cross-sectional side view of an exemplary high by-pass turbofan jet engine and a steam generating system, according to an aspect of the present disclosure.

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and the scope of the present disclosure.

As used herein, the terms "first" or "second" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "forward" and "aft" refer to relative positions within a turbine engine or a vehicle, and refer to the normal operational attitude of the turbine engine or the vehicle. For example, with regard to a turbine engine, forward refers to a position closer to an engine inlet and aft refers to a position closer to an engine nozzle or an exhaust.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, the terms "axial" and "axially" refer to directions and orientations that extend substantially parallel to a centerline of the aircraft gas turbine engine. Moreover, the terms "radial" and "radially" refer to directions and orientations that extend substantially perpendicular to the centerline of the aircraft gas turbine engine. In addition, as used herein, the terms "circumferential" and "circumferentially" refer to directions and orientations that extend arcuately about the centerline of the turbine engine.

Here and throughout the specification and claims, range limitations are combined, and interchanged. Such ranges are identified and include all the sub-ranges contained therein unless context or language indicates otherwise. For example, all ranges disclosed herein are inclusive of the endpoints, and the endpoints are independently combinable with each other.

In an aircraft gas turbine engine, a combustor may generally include a swirler that provides a flow of swirled air mixed with fuel into a combustion chamber, where the fuel and air mixture is ignited and burned. The burning of the fuel and air mixture in the combustion chamber results in carbon monoxide (CO) and nitrous oxide (NOx) emissions from the combustor. One technique to attempt to reduce the CO and the NOx emissions is to inject steam or water directly into the fuel and air mixture via, for example, a fuel nozzle, to mix with the fuel and air mixture within the swirler just prior to the mixture entering the combustion chamber for ignition. However, injecting steam directly into the fuel and air mixture within the swirler in this manner may result in a flameout condition, or may reduce the effectiveness and the efficiency of the combustion process such that not all of the fuel is ignited and burned within the combustor. Thus, it may be more desirable to inject steam into the combustor such that the steam can mix with the air injected into the combustor prior to passing through the swirler and being mixed with the fuel.

The present disclosure provides such a technique by including steam channels and steam nozzles within a cowl that surrounds the swirler assembly. Steam can be injected into a plenum defined by the cowl surrounding the swirler so that the steam can mix with compressed air that is injected into the combustor from a compressor. The cowl may also include steam nozzles that provide for the injection of steam into airflow passages of the combustor surrounding a combustor liner so that the steam may mix with airflow in the airflow passages before passing through airflow openings in the combustor liner and into a combustion chamber. As a result, the present disclosure provides a technique that may allow for more total steam injection into the combustor than a conventional technique of injecting steam directing into the fuel and air mixture within the swirler. By providing the ability to inject more steam into the combustor, a greater reduction in NOx emissions may be obtained by allowing a higher water to air ratio within the combustor.

The present disclosure also provides a gas turbine engine that may include a steam generation system that generates steam to be provided to the combustor. In a normal combustion process, not all of the energy and heat generated by the combustor is used to drive the turbine(s) of the turbine section. Instead, some waste heat is exhausted through a jet exhaust nozzle section in a conventional aircraft gas turbine engine. One aspect of an aircraft gas turbine engine discussed herein may include a steam generation system that is used to recover some of the energy from the waste heat by generating steam and driving a steam turbine. The steam generating system may inject steam directly into or upstream of the combustor. In addition, the steam generating system may recover water included in the exhaust gases so as to regenerate and to store water for use in the steam generating system.

Referring now to the drawings, FIG. 1 is a schematic cross-sectional diagram of an aircraft gas turbine engine 10 that may be installed on an aircraft (not shown) and that includes a steam generating system 100 (described below), taken along a longitudinal centerline axis 12 (provided for reference) of the aircraft gas turbine engine 10, according to an embodiment of the present disclosure. The present disclosure may be implemented in any of various types of aircraft turbine engines, including high bypass turbofan engines, turbojet engines, and turboprop engines. As shown in FIG. 1, the aircraft gas turbine engine 10 has a longitudinal direction L (extending parallel to the longitudinal centerline axis 12) and a radial direction R that is normal to the longitudinal direction L. In general, the aircraft gas turbine engine 10 includes a fan section 14 and a turbo-engine 16 disposed downstream from the fan section 14.

The turbo-engine 16 includes an outer casing 18 that is substantially tubular and defines an annular inlet 20. As schematically shown in FIG. 1, the outer casing 18 encases, in serial flow relationship, a compressor section 21 including a booster or a low-pressure compressor (LPC) 22, followed downstream by a high-pressure compressor (HPC) 24, a combustor 26, a turbine section 27 including a high-pressure turbine (HPT) 28 followed downstream by a low-pressure turbine (LPT) 30, and an exhaust section 31 that includes one or more core exhaust nozzles 32. A high-pressure (HP) shaft 34 drivingly connects the HPT 28 to the HPC 24 to rotate the HPT 28 and the HPC 24 in unison. A low-pressure (LP) shaft 36 drivingly connects the LPT 30 to the LPC 22 to rotate the LPT 30 and the LPC 22 in unison. The compressor section 21, the combustor 26, the turbine section 27, and the exhaust section 31 including the one or more core exhaust nozzles 32 together define a core air flow path 33 therethrough.

For the embodiment depicted in FIG. 1, the fan section 14 includes a fan 38 (e.g., a variable pitch fan) having a plurality of fan blades 40 coupled to a disk 42 in a circumferentially spaced-apart manner. As depicted in FIG. 1, the fan blades 40 extend outwardly from the disk 42 generally along the radial direction R. Each fan blade 40 is rotatable relative to the disk 42 about a pitch axis P by virtue of the fan blades 40 being operatively coupled to an actuator 44 configured to collectively vary the pitch of the fan blades 40 in unison. The fan blades 40, the disk 42, and the actuator 44 are together rotatable about the longitudinal centerline axis 12 via a fan shaft 45 that is powered by the LP shaft 36 across a power gearbox, also referred to as a gearbox assembly 46. The gearbox assembly 46 is shown schematically in FIG. 1. The gearbox assembly 46 includes a plurality of gears (not shown) for adjusting the rotational speed of the fan shaft 45 and, thus, adjusting the rotational speed of the fan 38 relative to the LP shaft 36.

Referring still to the exemplary embodiment of FIG. 1, the disk 42 is covered by a rotatable fan hub 48 that is aerodynamically contoured to promote an airflow through the plurality of fan blades 40. In addition, the fan section 14 includes an annular fan casing or a nacelle 50 that circumferentially surrounds the fan 38 and/or at least a portion of the turbo-engine 16. The nacelle 50 is supported relative to the turbo-engine 16 by a plurality of circumferentially spaced struts or outlet guide vanes 52. Moreover, a downstream section 54 of the nacelle 50 extends over an outer portion of the turbo-engine 16 to define a bypass airflow passage 56 therebetween. The one or more core exhaust nozzles 32 may extend through the nacelle 50 and be formed therein. In the embodiment of FIG. 1, the one or more core exhaust nozzles 32 include one or more discrete nozzles that are spaced circumferentially about the nacelle 50. Other arrangements of the one or more core exhaust nozzles 32 may be used including, for example, a single core exhaust nozzle that is annular, or partially annular, about the nacelle 50.

During a standard operating mode of the aircraft gas turbine engine 10, a volume of air 58 enters the aircraft gas turbine engine 10 through an inlet 60 of the nacelle 50 and/or the fan section 14. As the volume of air 58 passes across the fan blades 40, a first portion of air 58, shown as bypass air 62, is directed or routed into the bypass airflow passage 56, and a second portion of air 58, shown as core air 64, is directed or is routed into the upstream section of the core air flow path 33, or, more specifically, into the annular inlet 20 of the LPC 22. A ratio between the bypass air 62 and the core air 64 is known as a bypass ratio. The pressure of the core air 64 is then increased by the LPC 22, generating compressed air 65, and the compressed air 65 is routed through the HPC 24, where it is further compressed before being directed into the combustor 26, where the compressed air 65 is mixed with fuel 67 and burned to generate combustion gases 66 (also referred to as combustion products). One or more stages may be used in each of the LPC 22 and the HPC 24, with each subsequent stage further compressing the compressed air 65.

The combustion gases 66 are routed from the combustor 26 into the HPT 28 and expanded through the HPT 28, where a portion of thermal energy and/or kinetic energy from the combustion gases 66 is extracted via sequential stages of HPT stator vanes 68 that are coupled to the outer casing 18, and HPT rotor blades 70 that are coupled to rotors connected to the HP shaft 34, thus, causing the HP shaft 34 to rotate, thereby supporting operation of the HPC 24. The combustion gases 66 are then routed into the LPT 30 and are further expanded through the LPT 30. Here, a second portion of thermal energy and/or the kinetic energy is extracted from the combustion gases 66 via sequential stages of LPT stator vanes 72 that are coupled to the outer casing 18, and LPT rotor blades 74 that are coupled to LPT rotors connected to the LP shaft 36, thus, causing the LP shaft 36 to rotate, thereby supporting operation of the LPC 22 and rotation of the fan 38 via the gearbox assembly 46. One or more stages may be used in each of the HPT 28 and the LPT 30.

The combustion gases 66 are subsequently routed through the one or more core exhaust nozzles 32 of the turbo-engine 16 to provide propulsive thrust. Simultaneously with the flow of the core air 64 through the core air flow path 33, the bypass air 62 is routed through the bypass airflow passage 56 before being exhausted from a fan bypass nozzle 76 of the aircraft gas turbine engine 10, also providing propulsive thrust. The HPT 28, the LPT 30, and the one or more core exhaust nozzles 32 at least partially define a hot gas path 78 for routing the combustion gases 66 through the turbo-engine 16.

As noted above, the compressed air 65 is mixed with the fuel 67 in the combustor 26 to form a fuel and air mixture, and combusted, generating the combustion gases 66 (combustion products). The fuel 67 can include any type of hydrocarbon fuel used for turbine engines, such as, for example, sustainable aviation fuels (SAF) including biofuels, Jet A, Jet A-1, or other hydrocarbon fuels. Other fuel types, which may or may not be hydrocarbon fuels, but that may generally be used in an aircraft gas turbine engine may also be utilized to implement the present disclosure.

The aircraft gas turbine engine 10 includes a fuel system 80 for providing the fuel 67 to the combustor 26. The fuel system 80 includes a fuel tank 82 for storing the fuel 67 therein, and a fuel delivery assembly 84. The fuel tank 82 can be located on an aircraft (not shown) to which the aircraft gas turbine engine 10 is attached. While a single fuel tank 82 is shown in FIG. 1, the fuel system 80 can include any number of fuel tanks 82, as desired. The fuel delivery assembly 84 delivers the fuel 67 from the fuel tank 82 to the combustor 26 via one or more fuel supply lines 85. The fuel delivery assembly 84 also includes a fuel pump 86 to induce the flow of the fuel 67 through the fuel supply lines 85 to the combustor 26. In this way, the fuel pump 86 pumps the fuel 67 from the fuel tank 82, through the fuel supply lines 85, and into the combustor 26.

The aircraft gas turbine engine 10 of the present disclosure includes the steam generating system 100, which is in fluid communication with the one or more core exhaust nozzles 32 and the fan bypass nozzle 76. As will be described in more detail below, the steam generating system 100 generates steam from the combustion gases 66 as the combustion gases 66 flow through the steam generating system 100, and may deliver at least a portion of the generated steam to the combustor 26.

The aircraft gas turbine engine 10 depicted in FIG. 1 is by way of example only. In other exemplary embodiments, the aircraft gas turbine engine 10 may have any other suitable configuration. For example, in other exemplary embodiments, the fan 38 may be configured in any other suitable manner (e.g., as a fixed pitch fan) and further may be supported using any other suitable fan frame configuration. Moreover, in other exemplary embodiments, any other suitable number or configuration of compressors, turbines, shafts, or a combination thereof may be provided. In still other exemplary embodiments, aspects of the present disclosure may be incorporated into any other suitable aircraft gas turbine engine, such as, for example, turbofan engines, propfan engines, and/or turboprop engines.

Figure 2:
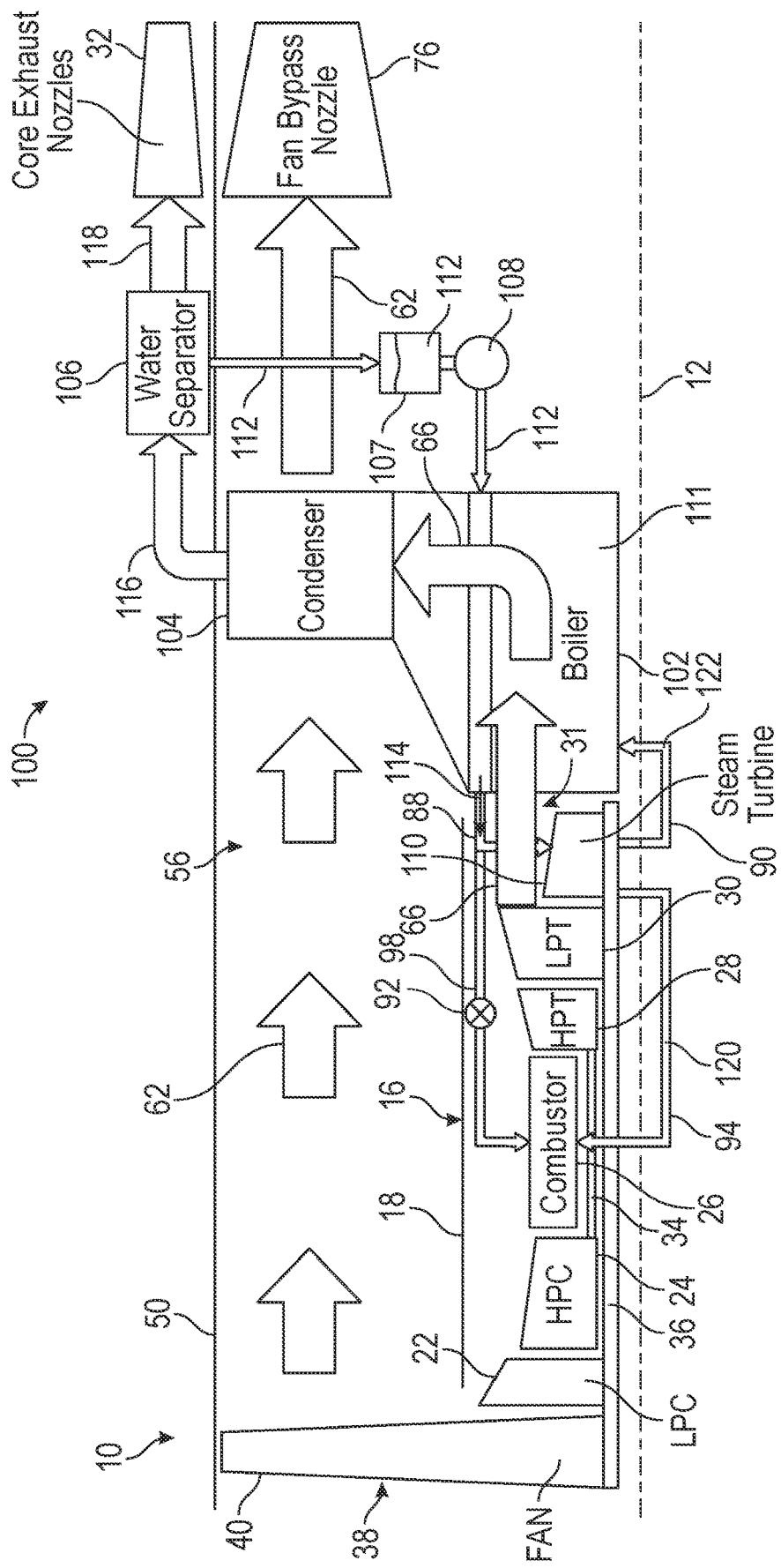
FIG. 2 is a schematic diagram of the high by-pass turbofan jet engine and the steam generating system of FIG. 1, according to an aspect of the present disclosure.

FIG. 2 is a schematic diagram of the aircraft gas turbine engine 10 and the steam generating system 100 of FIG. 1, according to an aspect of the present disclosure. For clarity, the aircraft gas turbine engine 10 is shown schematically in FIG. 2 and some components depicted and described above with regard to FIG. 1 are not shown in FIG. 2. As shown in FIG. 2, the steam generating system 100 includes a boiler 102, a condenser 104, a water/exhaust separator 106, a water pump 108, and a steam turbine 110.

The boiler 102 is a heat exchanger that vaporizes liquid water from a water source to generate steam or water vapor, as detailed further below. The boiler 102 is thus a steam source. In particular, the boiler 102 is an exhaust gas-water heat exchanger. The boiler 102 is in fluid communication with the hot gas path 78 (FIG. 1) and is positioned downstream of the LPT 30. The boiler 102 is also in fluid communication with the water pump 108, as detailed further below. The boiler 102 can include any type of boiler or heat exchanger for extracting heat from the combustion gases 66 and vaporizing liquid water into steam or water vapor as the liquid water and the combustion gases 66 flow through the boiler 102.

The condenser 104 is a heat exchanger that further cools the combustion gases 66 as the combustion gases 66 flow through the condenser 104, as detailed further below. In particular, the condenser 104 is an air-exhaust gas heat exchanger. The condenser 104 is in fluid communication with the boiler 102 and is positioned within the bypass airflow passage 56. The condenser 104 can include any type of condenser for condensing water from the exhaust (e.g., the combustion gases 66).

The water/exhaust separator 106 is in fluid communication with the condenser 104 for receiving cooled exhaust (combustion gases 66) having condensed water entrained therein. The water/exhaust separator 106 is also in fluid communication with the one or more core exhaust nozzles 32 and with the water pump 108. The water/exhaust separator 106 includes any type of water separator for separating water from the exhaust. For example, the water/exhaust separator 106 can include a cyclonic separator that uses vortex separation to separate the water from the exhaust. In such embodiments, the water/exhaust separator 106 generates a cyclonic flow within the water/exhaust separator 106 to separate the water from the cooled exhaust. In FIG. 2, the water/exhaust separator 106 is schematically depicted as being in the nacelle 50, but the water/exhaust separator 106 could be located at other locations within the aircraft gas turbine engine 10, such as, for example, radially inward of the nacelle 50, closer to the turbo-engine 16. The water/exhaust separator 106 may be driven to rotate by one of the engine shafts, such as the HP shaft 34 or the LP shaft 36. As noted above, the boiler 102 receives liquid water from a water source to generate steam or water vapor. The water source may be a water storage tank 107 that is provided between the water/exhaust separator 106 and the water pump 108. In the embodiment depicted in FIG. 2, the water storage tank 107 may, therefore, be the water source for the boiler 102.

The water pump 108 is in fluid communication with the water storage tank 107 and with the boiler 102. The water pump 108 may be any suitable pump, such as a centrifugal pump or a positive displacement pump. The water pump 108 directs separated water 112 that is stored in the water storage tank 107 through the boiler 102, where it is converted back to steam 114. The steam 114 is sent through the steam turbine 110 via a steam supply line 90 to provide work to drive the steam turbine 110.

In operation, the combustion gases 66, also referred to as exhaust, flow from the LPT 30 into the boiler 102 and into the condenser 104. The combustion gases 66 transfer heat into water 111 within the boiler 102 to generate steam 114 within the boiler 102, as detailed further below. The combustion gases 66 then flow into the condenser 104, where the condenser 104 condenses the water contained within the combustion gases 66. The bypass air 62 flows through the bypass airflow passage 56 and over or through the condenser 104, and extracts heat from the combustion gases 66, cooling the combustion gases 66 and condensing the water from the combustion gases 66, to generate an exhaust-water mixture 116. The bypass air 62 is then exhausted out of the aircraft gas turbine engine 10 through the fan bypass nozzle 76 to generate thrust, as detailed above. The condenser 104 thus may be positioned in the bypass airflow passage 56.

The exhaust-water mixture 116 flows into the water/exhaust separator 106. The water/exhaust separator 106 separates the water and the exhaust gases from the exhaust-water mixture 116 to generate separate exhaust gases 118 and water 112. The exhaust gases 118 are exhausted out of the aircraft gas turbine engine 10 through the one or more core exhaust nozzles 32 to generate thrust, as detailed above. The boiler 102, the condenser 104, and the water/exhaust separator 106 thus also define a portion of the hot gas path 78 (FIG. 1) for routing the combustion gases 66, the exhaust-water mixture 116, and the exhaust gases 118 through the steam generating system 100 of the aircraft gas turbine engine 10.

The water pump 108 helps to urge the water 112 from the water/exhaust separator 106 into the water storage tank 107, and pumps the water 112 through one or more water lines (as indicated by the arrow for the water 112 in FIG. 2) so that the water 112 flows into the boiler 102 to mix with the water 111. The water 111 flows through the boiler 102 and the combustion gases 66 flowing through the boiler 102 transfer heat into the water 111 to vaporize the water 111 and to generate the steam 114.

The steam turbine 110 is coupled to the LP shaft 36, but may also be coupled to the HP shaft 34. The steam turbine 110 includes one or more stages of steam turbine blades (not shown) and steam turbine stators (not shown). The steam 114 flows from the boiler 102 via a steam supply line 88 into the steam turbine 110, causing the steam turbine blades of the steam turbine 110 to rotate, thereby generating additional work in the LP shaft 36. Additionally, at least a portion of the steam 114 may flow through one or more combustor steam supply lines 98 into the combustor 26, and a valve 92 may be provided within the combustor steam supply line 98 to control a flow of the steam 114 into the combustor 26. As for the steam 114 provided to the steam turbine 110, the remaining steam (as steam 120) may then flow from the steam turbine 110, through one or more steam supply lines 94 and into the combustor 26. Alternatively, at least a portion of the remaining steam (as steam 122) may then flow from the steam turbine 110, through one or more steam supply lines 90, back into the boiler 102.

Figure 3:
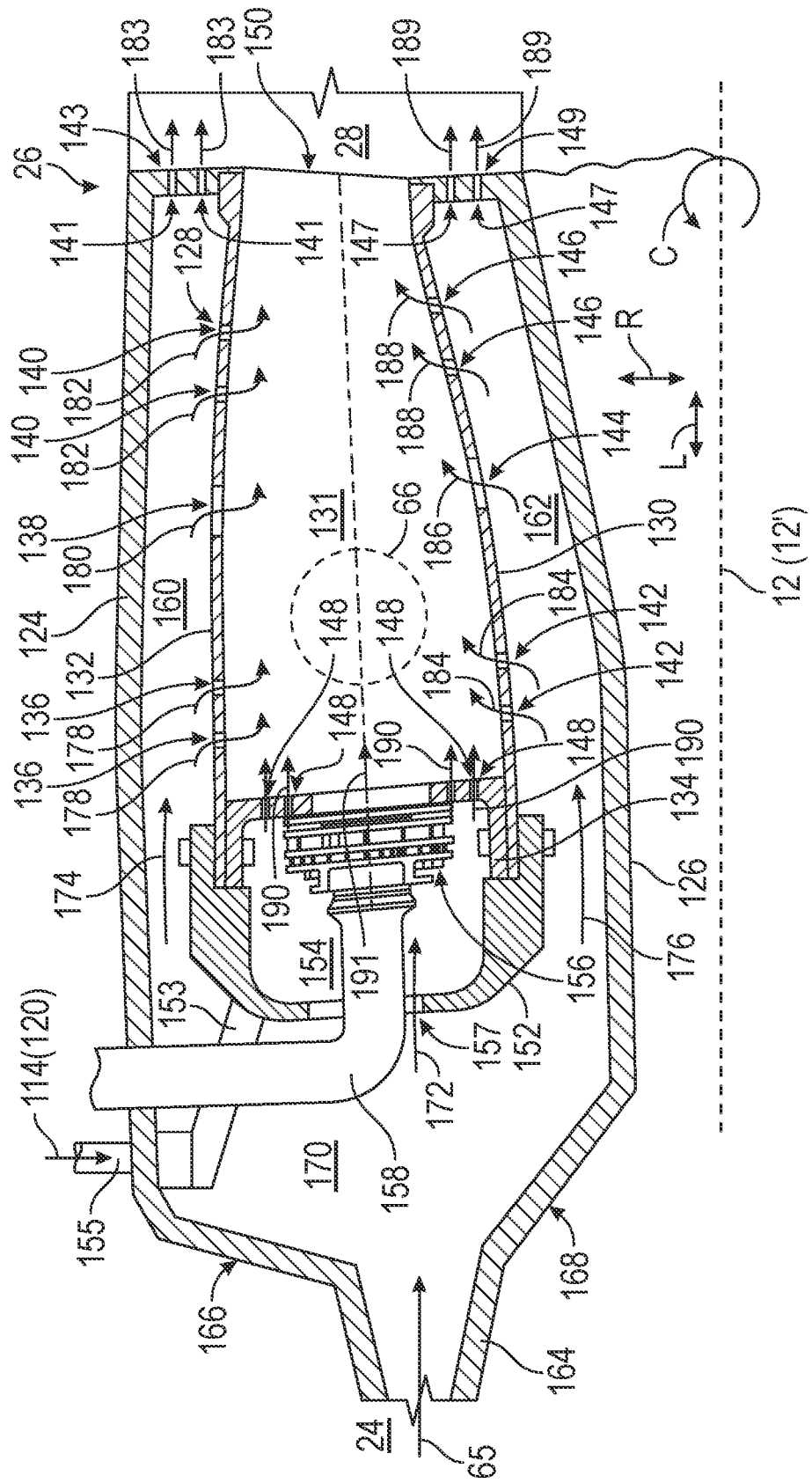
FIG. 3 is a partial cross-sectional side view of an exemplary combustor, according to an aspect of the present disclosure.

FIG. 3 is a partial cross-sectional side view of an exemplary combustor 26 of the turbo-engine 16 as shown in FIG. 1, according to an aspect of the present disclosure. The exemplary combustor 26 shown in FIG. 3 is depicted as an annular type combustion section that extends circumferentially about the longitudinal centerline axis 12. With respect to the combustor 26, the longitudinal centerline axis 12 may also correspond to a combustor centerline axis 12'. The annular combustor 26 includes an annular combustor outer casing 124, an annular combustor inner casing 126, and a combustor liner 128 arranged between the annular combustor outer casing 124 and the annular combustor inner casing 126. As shown in FIG. 3, the combustor liner 128 includes an annular inner liner 130, an annular outer liner 132, and an annular dome structure 134, each of which extends circumferentially about the combustor centerline axis 12'. The annular outer liner 132 may include various airflow openings therethrough, including a plurality of primary zone cooling openings 136, a plurality of dilution openings 138 (one shown in FIG. 3), and a plurality of secondary zone cooling openings 140. Similarly, the annular inner liner 130 may include various airflow openings therethrough, including a plurality of primary zone cooling openings 142, a plurality of dilution openings 144 (one shown in FIG. 3), and a plurality of secondary zone cooling openings 146. In addition, the annular dome structure 134 may include a plurality of cooling airflow openings 148 therethrough. In addition, a downstream end 143 of the annular combustor outer casing 124 may include a plurality of airflow openings 141 to provide a flow of turbine cooling air 183 into the HPT 28, and a downstream end 149 of the annular combustor inner casing 126 may include a plurality of airflow openings 147 to provide a flow of turbine cooling air 189 to the HPT 28. As will be described in more detail below, each of the various airflow openings through the annular inner liner 130, through the annular outer liner 132, and through the annular dome structure 134 allow for air to flow into an annular combustion chamber 131 to provide cooling of the combustor liner 128 or the annular dome structure 134, or to provide quenching of combustion gases within the annular combustion chamber 131. In addition, as will be described in more detail below, the air flowing through the various airflow openings may be mixed with steam to help to reduce NOx emissions.

The combustor 26 further includes a plurality of swirler assemblies 156 (one shown in FIG. 3) that are connected to the annular dome structure 134, and a plurality of fuel nozzle assemblies 158 (one shown in FIG. 3) that are connected to respective ones of the plurality of swirler assemblies 156.

The annular inner liner 130 and the annular outer liner 132 are connected to the annular dome structure 134, thereby defining the annular combustion chamber 131 therebetween. The annular inner liner 130 and the annular outer liner 132 may extend from the annular dome structure 134 to a combustor outlet 150 at an entry to the HPT 28 (FIG. 1), thus, at least partially defining a hot gas path between the annular dome structure 134 and the HPT 28. In addition, a cowl 152 is connected to the annular inner liner 130, the annular outer liner 132, and the annular dome structure 134, thereby defining a plenum 154 therewithin. The cowl 152 extends circumferentially about the longitudinal centerline axis 12 and may be formed of a single cowl structure or multiple cowl structures that are connected together. The cowl 152 includes a plurality of cowl airflow openings 157 (one shown in FIG. 3), where each opening corresponds to a respective one of the plurality of swirler assemblies 156. Each cowl airflow opening 157 provides a flow of air therethrough into the plenum 154. The cowl 152 may be connected to the annular combustion outer casing 124 via a cowl mounting arm 153. As will be described in more detail below, the cowl mounting arm 153 may be connected to a steam supply line 155 that is connected to, and is in fluid communication with, the combustor steam supply line 98 (FIG. 2) and with the steam supply line 94 (FIG. 2), and the cowl mounting arm 153 may include a steam channel therewithin that provides a flow of the steam 114, or the steam 120 (FIG. 2) therethrough to a steam channel and steam nozzles within the cowl 152.

As shown in FIG. 3, the annular combustor outer casing 124 and the annular combustor inner casing 126 surround the combustor liner 128. An outer airflow passage 160 is defined between the annular combustor outer casing 124 and the annular outer liner 132, and an inner airflow passage 162 is defined between the annular combustor inner casing 126 and the annular inner liner 130. A diffuser 164 is connected to the combustor 26 between an upstream end 166 of the annular combustor outer casing 124 and an upstream end of the annular combustor inner casing 126. A pressure plenum 170 is defined between the upstream end 166 of the annular combustor outer casing 124 and an upstream end 168 of the annular combustor inner casing 126. The diffuser 164 provides a flow of the compressed air 65 from the HPC 24 into the pressure plenum 170.

Referring still to FIG. 3, during operation of the aircraft gas turbine engine 10, the compressed air 65 flows through the diffuser 164 and into the pressure plenum 170 of the combustor 26 to pressurize the pressure plenum 170. A first portion of the compressed air 65 in the pressure plenum 170, as indicated schematically by an arrow denoting compressed air 172, flows from the pressure plenum 170 into the plenum 154 of the cowl 152. The compressed air 172 flows through the swirler assemblies 156, where it is mixed with fuel provided by the fuel nozzle assemblies 158. An air/fuel mixture is then injected into the annular combustion chamber 131 by the swirler assemblies 156, and the air/fuel mixture is ignited and burned to generate the combustion gases 66 within the annular combustion chamber 131. A portion of the compressed air 172 within the plenum 154, shown schematically by arrows denoting cooling air 190, may flow through the cooling airflow openings 148 in the annular dome structure 134 to provide cooling of a downstream side of the annular dome structure 134. It is noted that, while not shown in FIG. 3, the annular dome structure 134 may include a deflector or a heat shield on the downstream side to protect the annular dome structure 134 from heat generated in the annular combustion chamber 131, and the cooling airflow openings 148 would extend through the deflector or the heat shield.

A second portion of the compressed air 65 in the pressure plenum 170, as indicated schematically by arrows denoting compressed air 174 and compressed air 176, may be routed into the outer airflow passage 160, and into the inner airflow passage 162, respectively. A portion of the compressed air 174 flowing through the outer airflow passage 160, shown schematically as cooling air 178, may be routed through the plurality of primary zone cooling openings 136 into the annular combustion chamber 131. Another portion of the compressed air 174 flowing through the outer airflow passage 160, shown schematically as dilution airflow 180, may be routed through the dilution openings 138 of the annular outer liner 132 into the annular combustion chamber 131 to provide quenching of the combustion gases 66. Yet another portion of the compressed air 174 flowing through the outer airflow passage 160, shown schematically as cooling air 182, may be routed through the secondary zone cooling openings 140 into the annular combustion chamber 131. Similarly, a portion of the compressed air 176 flowing through the inner airflow passage 162, shown schematically as cooling air 184, may be routed through the plurality of primary zone cooling openings 142 into the annular combustion chamber 131. Another portion of the compressed air 176 flowing through the inner airflow passage 162, shown schematically as dilution airflow 186, may be routed through the dilution openings 144 of the annular inner liner 130 into the annular combustion chamber 131 to provide quenching of the combustion gases 66. Yet another portion of the compressed air 176 flowing through the inner airflow passage 162, shown schematically as cooling air 188, may be routed through the secondary zone cooling openings 146 into the annular combustion chamber 131.

Figure 4:
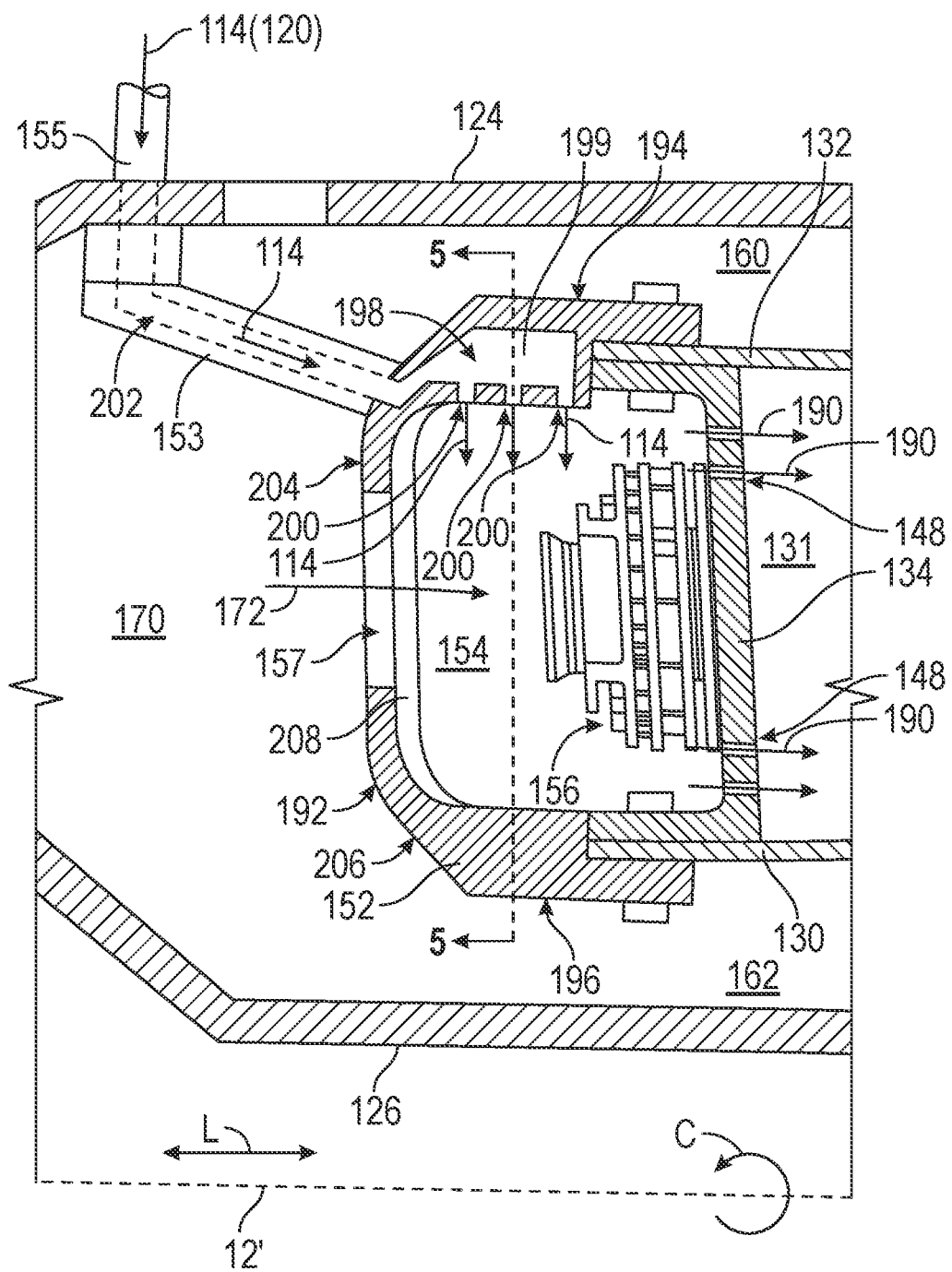
FIG. 4 is a detail view of a cowl and a swirler portion of FIG. 3 depicting steam channels in the cowl, according to an aspect of the present disclosure.

FIG. 4 is a detail view of the cowl and swirler portion of FIG. 3 depicting steam channels in the cowl 152, according to an aspect of the present disclosure. In FIG. 4, the cowl 152 includes an upstream wall portion 192, a cowl outer wall portion 194 that extends downstream from an outer end 204 of the upstream wall portion 192, and a cowl inner wall portion 196 that extends downstream from an inner end 206 of the upstream wall portion 192. The cowl airflow opening 157 of the cowl 152 extends through the upstream wall portion 192 and provides the flow of compressed air 172 from the pressure plenum 170 into the plenum 154. The cowl 152 includes a cowl steam channel 198 therewithin and a plurality of outer steam injection nozzles 200. As shown in FIG. 4, the plurality of outer steam injection nozzles 200 are shown to include three outer steam injection nozzles 200 that are longitudinally spaced apart from one another in the longitudinal direction L. However, more than three outer steam injection nozzles 200 or fewer than three outer steam injection nozzles 200 can be included instead. In addition, the longitudinal spacing between respective ones of the outer steam injection nozzles 200 may be the same, or a different longitudinal spacing may be implemented between respective ones of the outer steam injection nozzles 200.

The cowl steam channel 198 may include an outer steam manifold 199 that is arranged within the cowl outer wall portion 194. The cowl mounting arm 153 also includes a mounting arm steam channel 202 therewithin (shown with dashed lines as being hidden inside of the cowl mounting arm 153) that is in fluid communication with the cowl steam channel 198 of the cowl 152, and is also in fluid communication with the steam supply line 155. Thus, a flow of the steam 114 and the steam 120 can be provided through the mounting arm steam channel 202 to the cowl steam channel 198 of the cowl 152, and through the plurality of outer steam injection nozzles 200 into the plenum 154. The steam 114 and the steam 120 can then mix with the compressed air 172 within the plenum 154 to form an air/steam mixture that can then flow through the swirler assembly 156, where the air/steam mixture is further mixed with fuel before being injected into the annular combustion chamber 131 to be ignited and burned to generate the combustion gases 66 (FIG. 3). For the following description, references to the steam 114 include the steam 120, and for brevity, only the steam 114 will be referenced.

Figure 5:
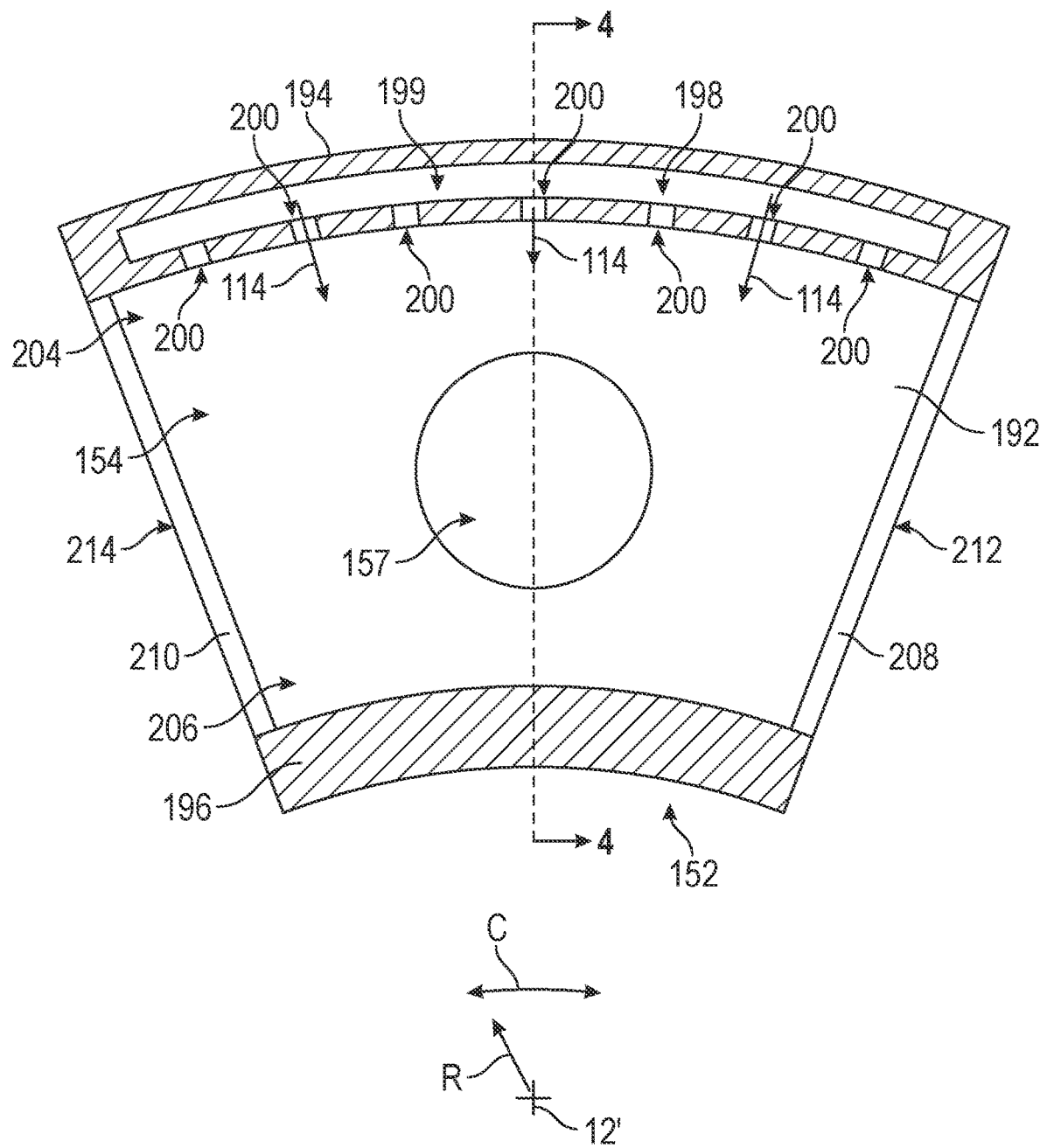
FIG. 5 is a partial cross-sectional view of the cowl of FIG. 4, taken at plane 5-5 of FIG. 4, according to an aspect of the present disclosure.

FIG. 5 is a partial cross-sectional view of the cowl 152, taken at plane 5-5 of FIG. 4, according to an aspect of the present disclosure. As shown in FIG. 5, the cowl 152 generally extends in the circumferential direction (C) with respect to the longitudinal centerline axis 12', and, thus, both the cowl outer wall portion 194 and the cowl inner wall portion 196 also extend in the circumferential direction C. In FIG. 5, the outer steam manifold 199 extends in the circumferential direction within the cowl outer wall portion 194 and the plurality of outer steam injection nozzles 200 may be spaced apart circumferentially through the cowl outer wall portion 194. In FIG. 5, although a single circumferential row of the outer steam injection nozzles 200 is shown, the outer steam manifold 199 may include multiple circumferential rows of outer steam injection nozzles 200. For example, the outer steam manifold 199 may include three circumferential rows of the outer steam injection nozzles 200, where each circumferential row corresponds to one of the three longitudinally spaced apart outer steam injection nozzles 200 as shown in FIG. 4, such that each circumferential row is spaced apart from one another in the longitudinal direction L. In addition, within each circumferential row of the outer steam injection nozzles 200, the circumferential spacing between respective ones of the outer steam injection nozzles 200 may be the same circumferential spacing, or different circumferential spacings may be implemented between respective ones of the outer steam injection nozzles 200.

A size (e.g., a hole diameter) of each of the outer steam injection nozzles 200 and the total number of the outer steam injection nozzles 200 included in the cowl 152 are designed so as to provide a desired amount of the steam into the plenum 154. In addition, the circumferential location of each of the outer steam injection nozzles 200, and the longitudinal location of each of the outer steam injection nozzles 200, are arranged so as to provide a desired amount of steam in a particular circumferential location and in a particular longitudinal location within the plenum 154.

The cowl 152 shown in FIG. 5 also includes a first rib 208 on a first circumferential side 212 of the upstream wall portion 192, where the first rib 208 extends downstream from the upstream wall portion 192 and extends between the cowl outer wall portion 194 and the cowl inner wall portion 196. The cowl 152 also includes a second rib 210 on a second circumferential side 214 of the upstream wall portion 192, where the second rib 210 extends downstream from the upstream wall portion 192, and extends between the cowl outer wall portion 194 and the cowl inner wall portion 196. Both the first rib 208 and the second rib 210 provide structural support for the cowl outer wall portion 194 and the cowl inner wall portion 196. In addition, the first rib 208 and the second rib 210 define, at least in part, circumferential boundaries of the plenum 154. For reference purposes, the first rib 208 is shown in FIG. 4 in the background, and, in FIG. 5, a plane 4-4 is shown as the cut-plane for the cross-sectional view of FIG. 4.

Figure 6:
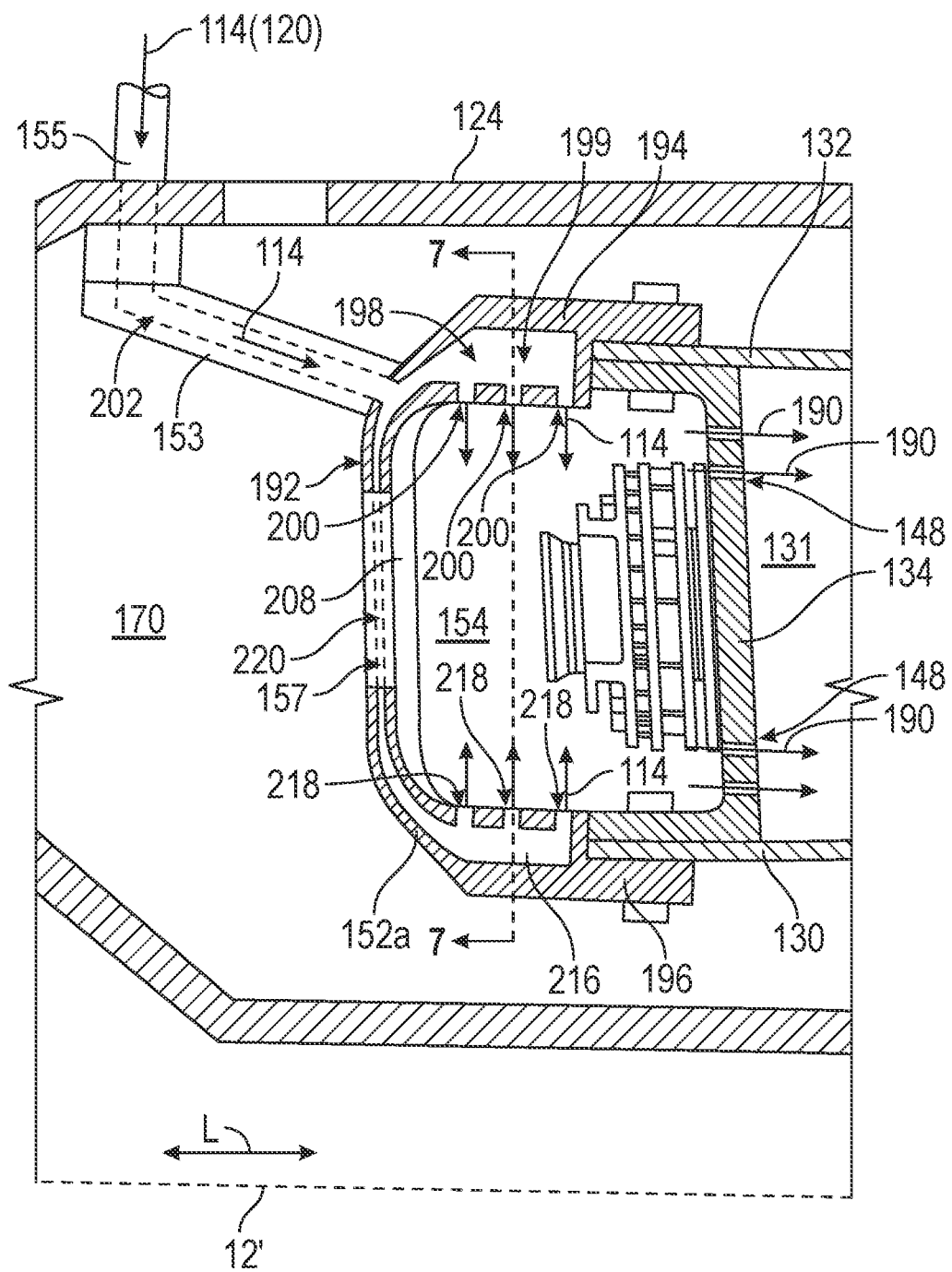
FIG. 6 is a partial cross-sectional view of an alternate cowl to that shown in FIG. 4, according to an aspect of the present disclosure.

FIG. 6 is a partial cross-sectional view of an alternate cowl 152a to that shown in FIG. 4, according to an aspect of the present disclosure. In FIG. 6, elements that are the same as those shown in FIG. 4 are labeled with the same reference numerals. In the FIG. 6 aspect, the alternate cowl 152a includes the cowl steam channel 198 with the outer steam manifold 199 and the outer steam injection nozzles 200, but the cowl steam channel 198 also includes an inner steam manifold 216 arranged within the cowl inner wall portion 196. The inner steam manifold 216, similar to the outer steam manifold 199, includes a plurality of inner steam injection nozzles 218 that provide a flow of the steam 114 from the inner steam manifold 216 into the plenum 154. Similar to the outer steam manifold 199, the inner steam manifold 216 is shown to include three inner steam injection nozzles 218 that are longitudinally spaced apart from one another. In the same manner as the outer steam injection nozzles 200, the inner steam injection nozzles 218 may be equally spaced apart in the longitudinal direction, or may have a different longitudinal spacing between respective ones of the inner steam injection nozzles 218. While FIG. 6 depicts the outer steam manifold 199 as being generally located within the cowl outer wall portion 194, the outer steam manifold 199 may instead be located partially within the cowl outer wall portion 194 and partially within the upstream wall portion 192 of the cowl 152. Similarly, while FIG. 6 depicts the inner steam manifold 216 as being generally located within the cowl inner wall portion 196, the inner steam manifold 216 may instead be located partially within the cowl inner wall portion 196 and partially within the upstream wall portion 192 of the cowl 152.

The cowl 152a also includes, as part of the cowl steam channel 198, at least one connecting steam channel 220 within the upstream wall portion 192. The at least one connecting steam channel 220 is connected to both the outer steam manifold 199 and the inner steam manifold 216. Thus, the at least one connecting steam channel 220 provides fluid communication between the outer steam manifold 199 and the inner steam manifold 216 so that the steam 114 provided to the outer steam manifold 199 via the mounting arm steam channel 202 of the cowl mounting arm 153 may flow from the outer steam manifold 199 to the inner steam manifold 216.

Figure 7:
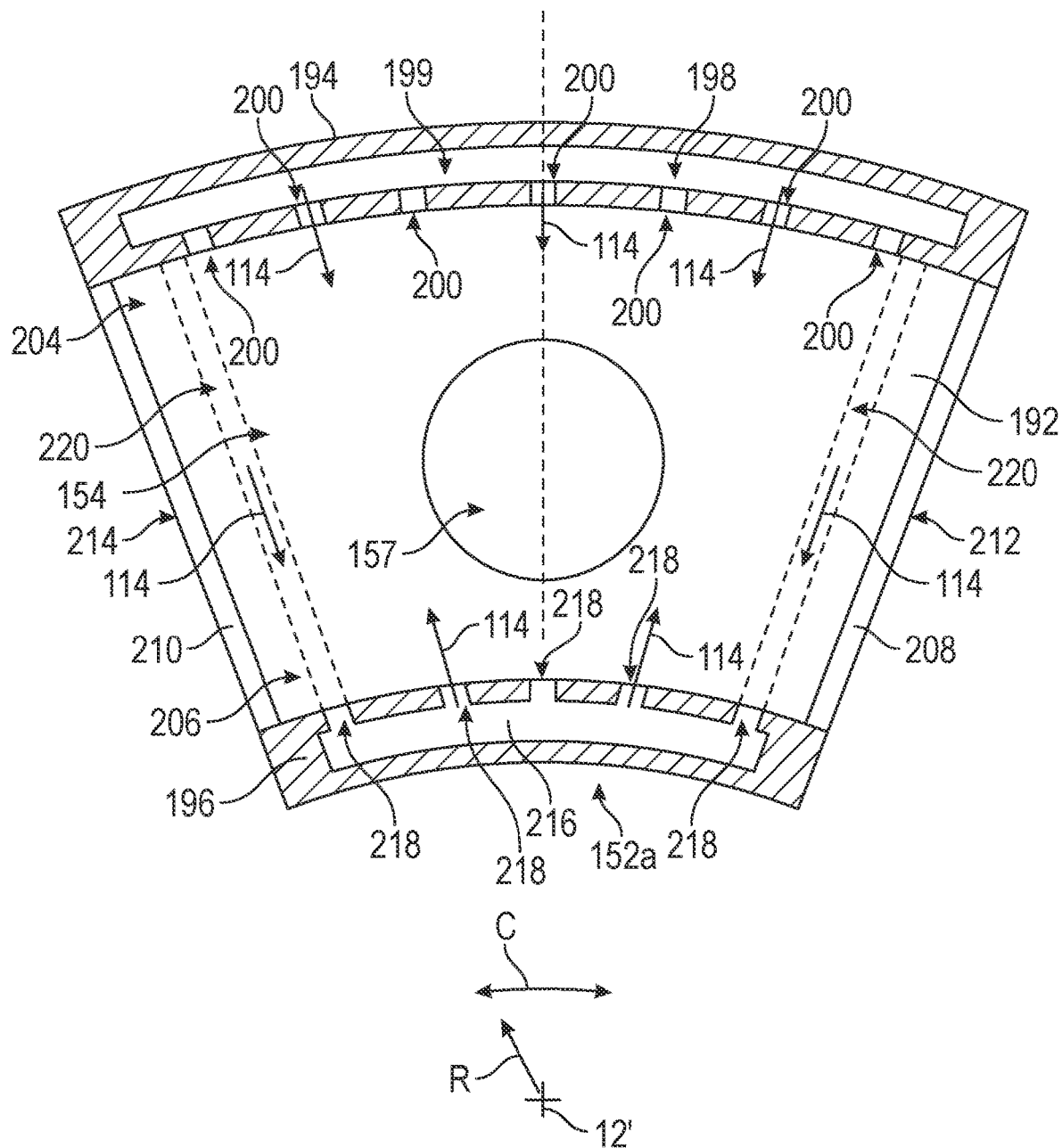
FIG. 7 is a partial cross-sectional view of the alternate cowl of FIG. 6, taken at plane 7-7 of FIG. 6, according to an aspect of the present disclosure.

FIG. 7 is a partial cross-sectional view of the alternate cowl 152a, similar to the cross-sectional view of FIG. 5, taken at plane 7-7 of FIG. 6, according to an aspect of the present disclosure. In FIG. 7, elements that are the same as those shown in FIG. 6 include the same reference numerals. As shown in FIG. 7, the inner steam manifold 216, similar to the outer steam manifold 199, extends in the circumferential direction C within the cowl inner wall portion 196, and the plurality of inner steam injection nozzles 218 may be spaced apart circumferentially. Similar to the FIG. 5 aspect, in FIG. 7 the outer steam manifold 199 extends in the circumferential direction within the cowl outer wall portion 194 and the plurality of outer steam injection nozzles 200 may be spaced apart circumferentially through the cowl outer wall portion 194. In FIG. 7, although a single circumferential row of the inner steam injection nozzles 218 is shown, the inner steam manifold 216 may include multiple circumferential rows of inner steam injection nozzles 218. For example, the inner steam manifold 216 may include three circumferential rows of the inner steam injection nozzles 218, where each circumferential row corresponds to one of the three longitudinally spaced apart inner steam injection nozzles 218 as shown in FIG. 6, such that each circumferential row is spaced apart from one another in the longitudinal direction L. In addition, within each circumferential row of the inner steam injection nozzles 218, the circumferential spacing between respective ones of the inner steam injection nozzles 218 may be the same circumferential spacing, or different circumferential spacings may be implemented between respective ones of the inner steam injection nozzles 218.

A size (e.g., a hole diameter) of each of the outer steam injection nozzles 200 and the total number of the outer steam injection nozzles 200 included in the cowl 152, along with a size of each of the inner steam injection nozzles 218 and a number of the inner steam injection nozzles 218 in the cowl 152, is designed to provide a desired amount of the steam into the plenum 154. In addition, the circumferential location of each of the outer steam injection nozzles 200 and the inner steam injection nozzles 218, and the longitudinal location of each of the outer steam injection nozzles 200 and the inner steam injection nozzles 218, are arranged so as to provide a desired amount of steam in a particular circumferential and longitudinal location within the plenum 154.

Figure 8:
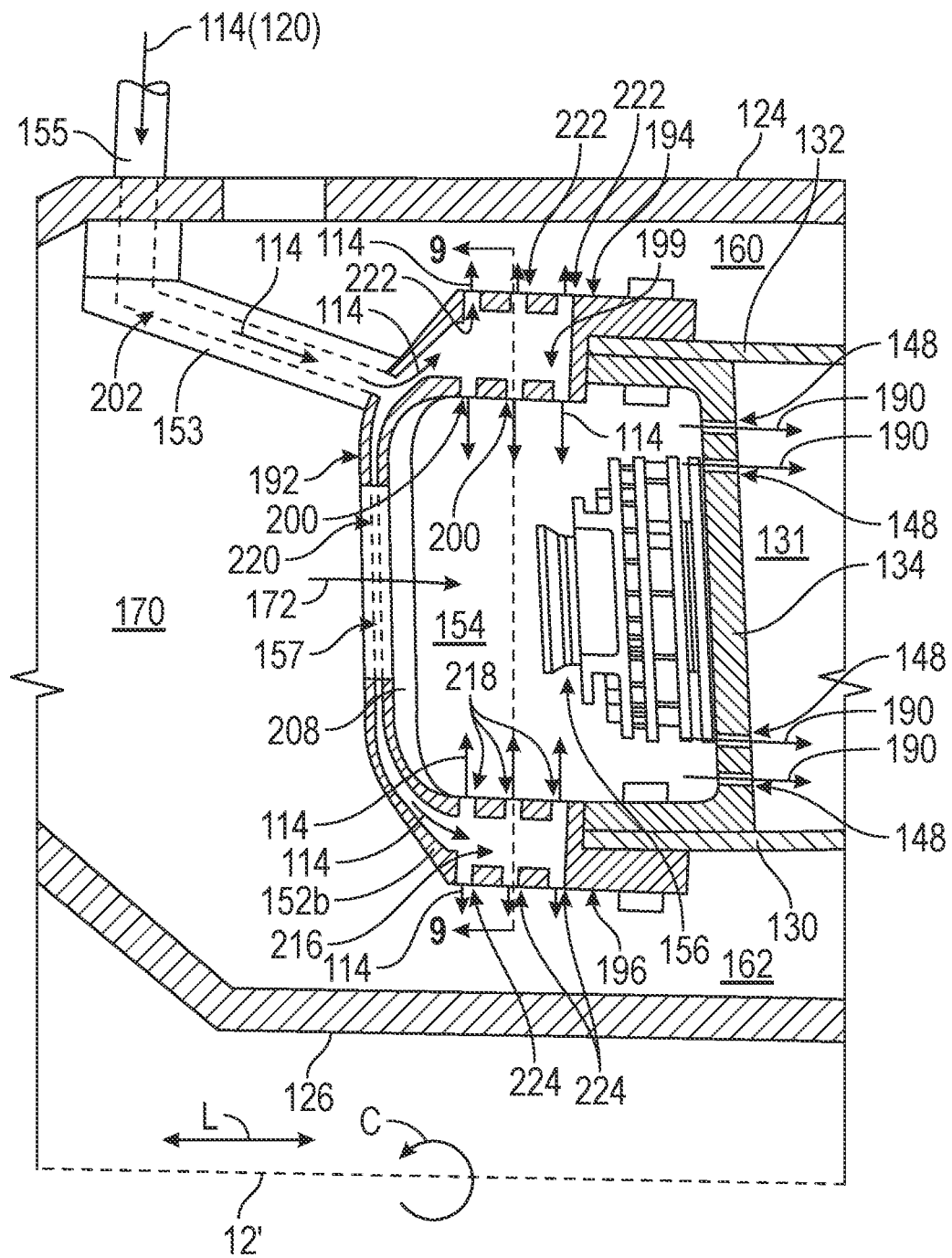
FIG. 8 is a partial cross-sectional view of an alternate cowl to that shown in FIG. 6, according to an aspect of the present disclosure.

FIG. 8 is a partial cross-sectional view of an alternate cowl 152b to that shown in FIG. 6, according to an aspect of the present disclosure. In FIG. 8, elements that are the same as those shown in FIG. 6 are labeled with the same reference numerals. The FIG. 8 aspect is generally the same as the FIG. 6 aspect, but the alternate cowl 152b includes additional steam injection nozzles for injecting steam into the outer airflow passage 160 and into the inner airflow passage 162. In particular, the outer steam manifold 199 is shown in FIG. 8 to include a plurality of cowl outer airflow passage steam injection nozzles 222 for injecting the steam 114 into the outer airflow passage 160. In addition, the inner steam manifold 216 is shown in FIG. 8 to include a plurality of cowl inner airflow passage steam injection nozzles 224 for injecting the steam 114 into the inner airflow passage 162. Thus, a first portion of the steam 114 in the outer steam manifold 199 is injected into the plenum 154 and a second portion of the steam 114 in the outer steam manifold 199 is injected into the outer airflow passage 160. In FIG. 8, the plurality of cowl outer airflow passage steam injection nozzles 222 is shown to include three longitudinally spaced apart cowl outer airflow passage steam injection nozzles 222, and the plurality of cowl inner airflow passage steam injection nozzles 224 is shown to include three longitudinally spaced apart cowl inner airflow passage steam injection nozzles 224.

Figure 9:
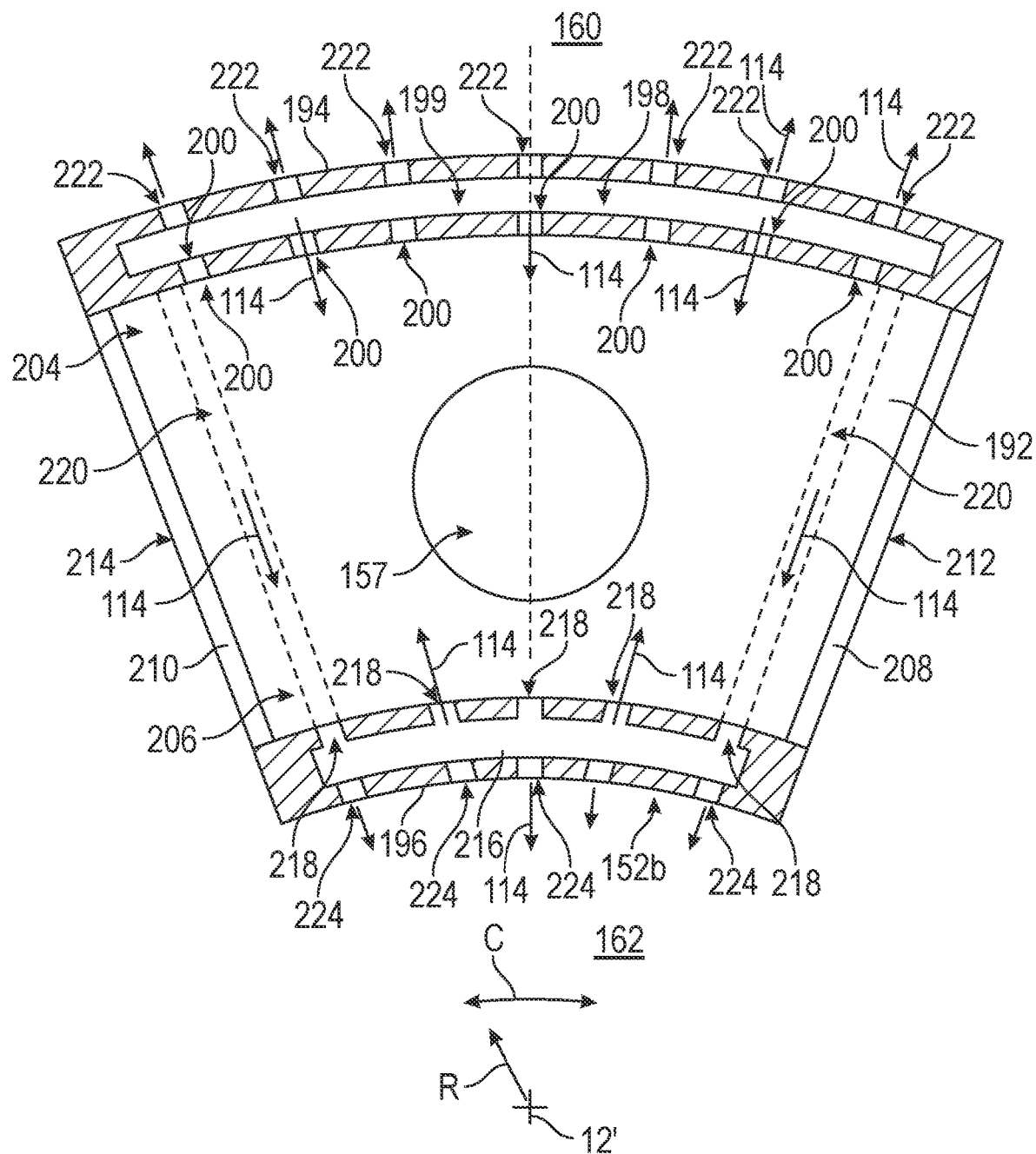
FIG. 9 is a partial cross-sectional view of the alternate cowl of FIG. 8, taken at plane 9-9 of FIG. 8, according to an aspect of the present disclosure.

FIG. 9 is a partial cross-sectional view of the alternate cowl of FIG. 8, taken at plane 9-9 of FIG. 8, according to an aspect of the present disclosure. In FIG. 9, elements that are the same as those shown in FIG. 8 include the same reference numerals. Similar to the outer steam injection nozzles 200, the plurality of cowl outer airflow passage steam injection nozzles 222 are circumferentially spaced apart from each other in a circumferential row, and multiple circumferential rows of the cowl outer airflow passage steam injection nozzles 222 may be included in the outer steam manifold 199. In addition, the plurality of cowl inner airflow passage steam injection nozzles 224 are circumferentially spaced apart from each other in a circumferential row, and multiple circumferential rows of the cowl inner airflow passage steam injection nozzles 224 may be included in the inner steam manifold 216. A size of each of the outer steam injection nozzles 200 and the number of the outer steam injection nozzles 200, along with a size of each of the inner steam injection nozzles 218 and a number of the inner steam injection nozzles 218 is designed to provide a desired amount of the steam into the plenum 154.

A size (e.g., a hole diameter) of each of the outer steam injection nozzles 200 and the total number of the outer steam injection nozzles 200 included in the cowl 152, along with a size of each of the inner steam injection nozzles 218 and a total number of the inner steam injection nozzles 218 in the cowl 152a, is designed to provide a desired amount of the first portion of the steam 114 from the outer steam manifold 199 and from the inner steam manifold 216 into the plenum 154. In addition, a size (e.g., a hole diameter) of each of the cowl outer airflow passage steam injection nozzles 222 and the total number of the cowl outer airflow passage steam injection nozzles 222 included in the cowl 152a, are designed to provide a desired amount of the second portion of the steam 114 from the outer steam manifold 199 into the outer airflow passage 160. Similarly, a size (e.g., a hole diameter) of each of the cowl inner airflow passage steam injection nozzles 224 and the total number of the cowl inner airflow passage steam injection nozzles 224 included in the cowl 152a, are designed to provide a desired amount of the second portion of the steam 114 from the inner steam manifold 216 into the inner airflow passage 162. Further, the circumferential location of each of the cowl outer airflow passage steam injection nozzles 222, and the longitudinal location of each of the cowl outer airflow passage steam injection nozzles 222, are arranged so as to provide a desired amount of second portion of the steam 114 in a particular circumferential location and a particular longitudinal location within the outer airflow passage 160. Similarly, the circumferential location of each of the cowl inner airflow passage steam injection nozzles 224, and the longitudinal location of each of the cowl inner airflow passage steam injection nozzles 224, are arranged so as to provide a desired amount of second portion of the steam 114 in a particular circumferential location and a particular longitudinal location within the inner airflow passage 162.

Figure 10:
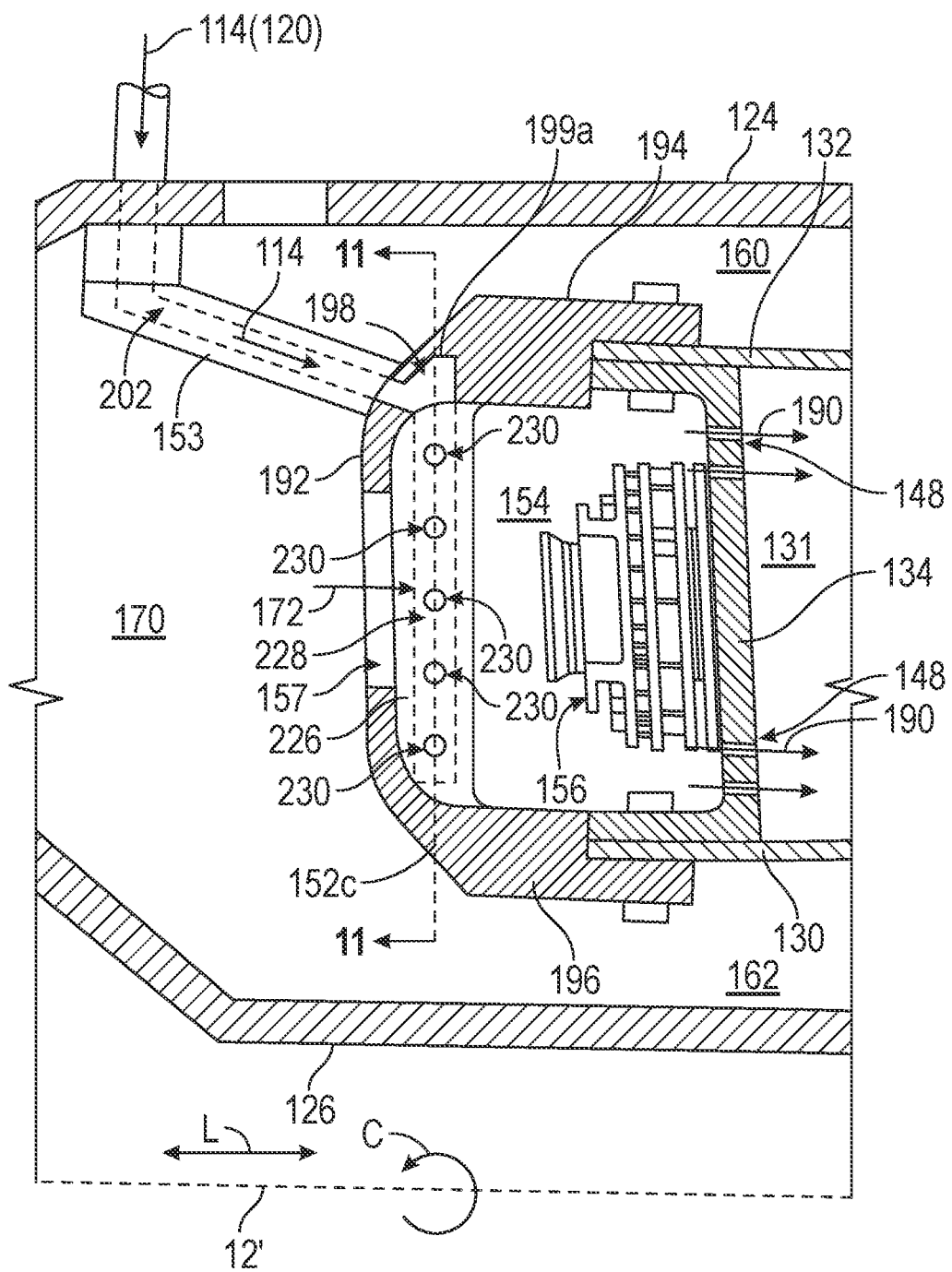
FIG. 10 is a partial cross-sectional view of another alternate cowl to that shown in FIG. 6, according to an aspect of the present disclosure.
Figure 11:
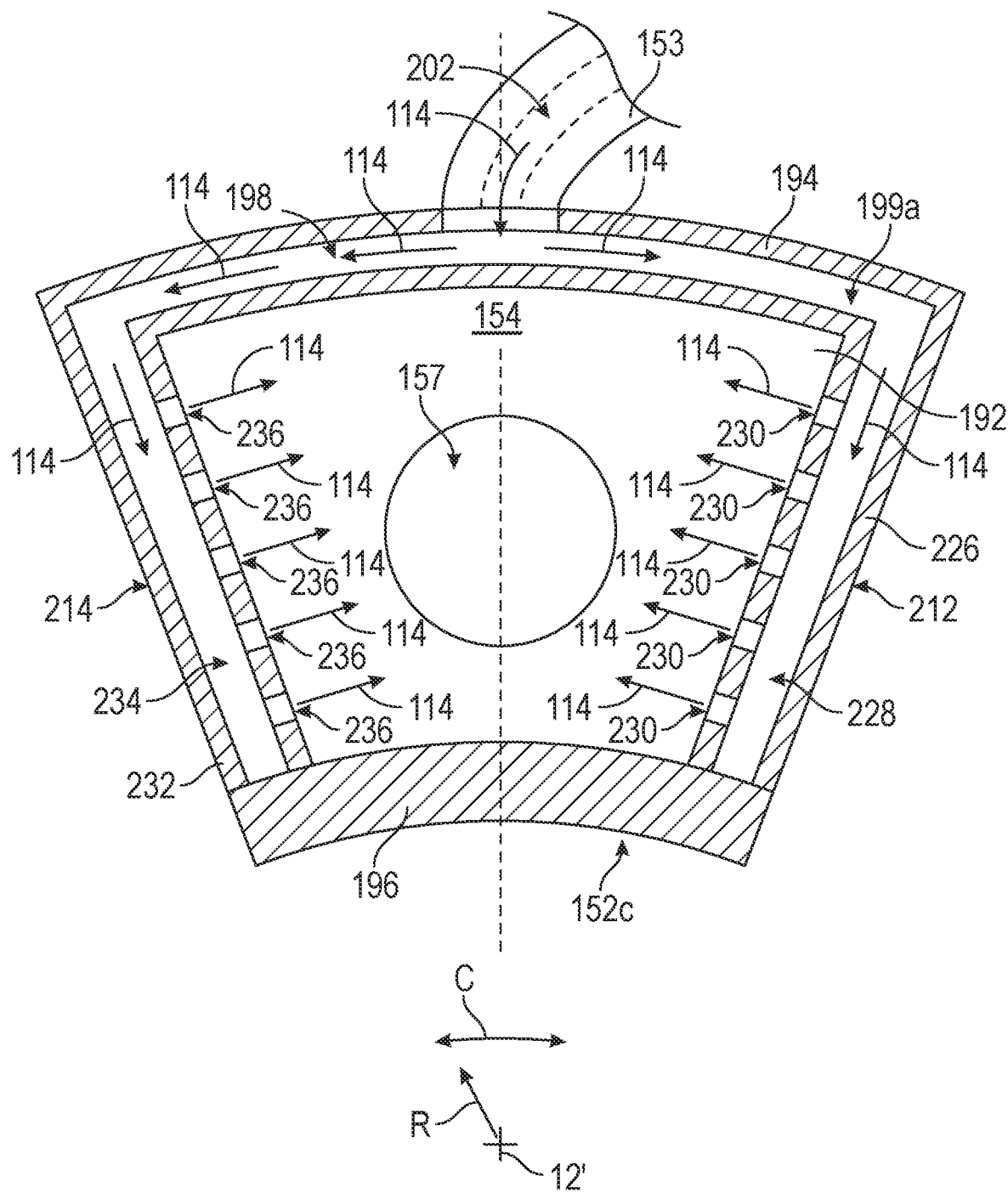
FIG. 11 is a partial cross-sectional view of the alternate cowl of FIG. 10, taken at plane 11-11 of FIG. 10, according to an aspect of the present disclosure.

FIG. 10 is a partial cross-sectional view of another alternate cowl to that shown in FIG. 4, according to an aspect of the present disclosure. FIG. 11 is a partial cross-sectional view of the alternate cowl of FIG. 10, taken at plane 11-11 of FIG. 10, according to an aspect of the present disclosure. In FIG. 10 and FIG. 11, elements that are the same as those shown in FIG. 4 are labeled with the same reference numerals. Referring collectively to FIG. 10 and to FIG. 11, the cowl 152c includes an outer steam manifold 199a in the cowl outer wall portion 194. Similar to the FIG. 5 aspect, the outer steam manifold 199a extends in the circumferential direction C between the first circumferential side 212 of the cowl 152c and the second circumferential side 214 of the cowl 152c. Similar to the cowl 152 of the FIG. 5 aspect, the cowl 152c includes a first rib 226 on the first circumferential side 212 of the cowl 152c, and a second rib 232 on the second circumferential side 214 of the cowl 152c. However, in contrast to the FIG. 5 aspect, the first rib 226 extends further downstream from the upstream wall portion 192 than the first rib 208. In addition, the first rib 226 includes, as part of the cowl steam channel 198, a first rib steam channel 228 that is in fluid communication with the outer steam manifold 199a, and the second rib 232 includes, as part of the cowl steam channel 198, a second rib steam channel 234 that is also in fluid communication with the outer steam manifold 199a. Further, the first rib 226 includes a plurality of first rib steam injection nozzles 230 that provide a flow of the steam 114 from the first rib steam channel 228 into the plenum 154, and the second rib 232 includes a plurality of second rib steam injection nozzles 236 that provide a flow of the steam 114 from the second rib steam channel 234 into the plenum 154.

Figure 12:
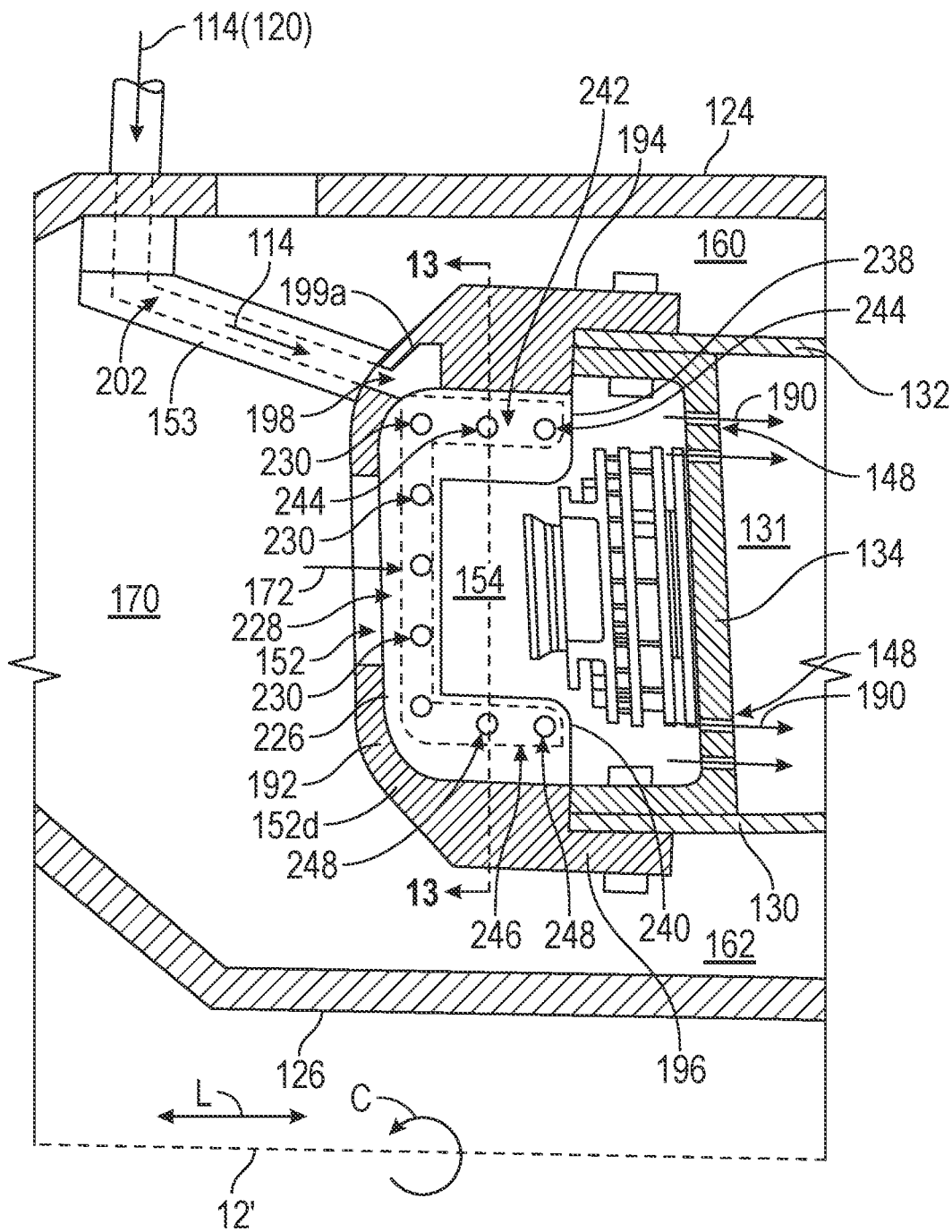
FIG. 12 is a partial cross-sectional view of an alternate cowl to that shown in FIG. 10, according to another aspect of the present disclosure.
Figure 13:
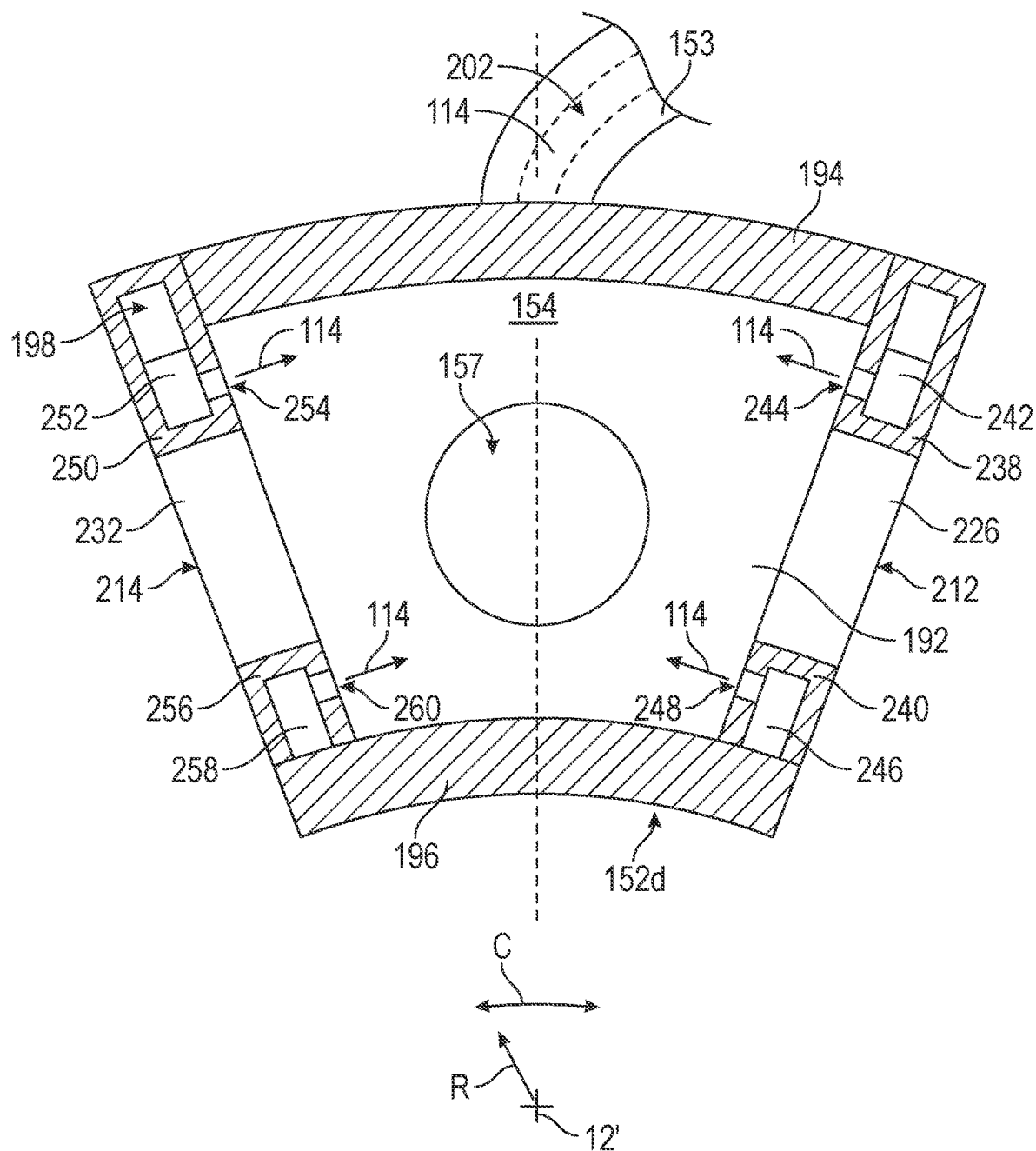
FIG. 13 is a partial cross-sectional view through the alternate cowl of FIG. 12, taken at plane 13-13 of FIG. 12, according to an aspect of the present disclosure.

FIG. 12 is a partial cross-sectional view of an alternate cowl 152d to that shown in FIG. 10, according to an aspect of the present disclosure. FIG. 13 is a partial cross-sectional view through the alternate cowl 152d of FIG. 12, taken at plane 13-13, according to an aspect of the present disclosure. In FIG. 12 and in FIG. 13, elements that are the same as those shown in FIG. 10 and in FIG. 11 are labeled with the same reference numerals. The alternate cowl 152d of FIG. 12 and FIG. 13, similar to the FIG. 10 aspect, includes the first rib 226 having the first rib steam channel 228 and the plurality of first rib steam injection nozzles 230, and the second rib 232 having the second rib steam channel 234 and the plurality of second rib steam injection nozzles 236. However, in the FIG. 12 aspect, the first rib 226 includes a first rib outer longitudinal rib portion 238 extending at least partially along the cowl outer wall portion 194, and a first rib inner longitudinal rib portion 240 extending at least partially along the cowl inner wall portion 196. The first rib outer longitudinal rib portion 238 includes, as part of the cowl steam channel 198, a steam channel 242 therewithin that is in fluid communication with the first rib steam channel 228 of the first rib 226, and at least one steam injection nozzle 244 arranged to inject the steam 114 from the steam channel 242 into the plenum 154. Similarly, the first rib inner longitudinal rib portion 240 includes, as part of the cowl steam channel 198, a steam channel 246 therewithin that is in fluid communication with the first rib steam channel 228 of the first rib 226, and at least one steam injection nozzle 248 arranged to inject the steam 114 from the steam channel 246 into the plenum 154. In a similar manner, as shown in FIG. 13, the second rib 232 includes a second rib outer longitudinal rib portion 250 that includes a steam channel 252 that is in fluid communication with the second rib steam channel 234 (FIG. 11), and at least one steam nozzle 254 arranged to inject the steam 114 from the steam channel 252 into the plenum 154. The second rib 232 also includes a second rib inner longitudinal portion 256 that includes a steam channel 258 therewithin that is in fluid communication with the second rib steam channel 234 (FIG. 11) of the second rib 232, and at least one steam injection nozzle 260 arranged to inject the steam 114 from the steam channel 258 into the plenum 154.

Figure 14:
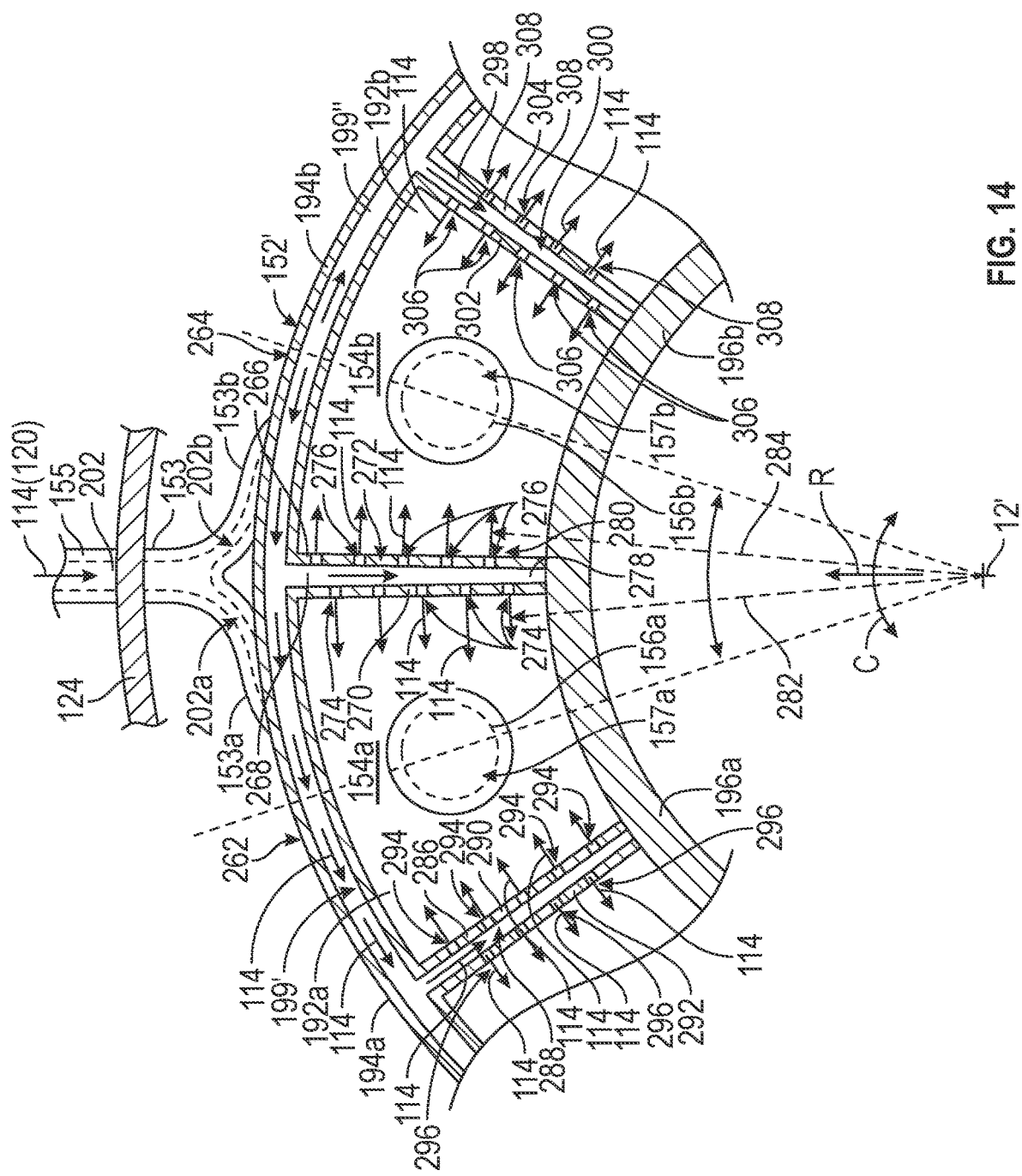
FIG. 14 is an alternate partial cross-sectional view of the cowl shown FIG. 11 extended circumferentially to an adjacent cowl, according to an aspect of the present disclosure.

FIG. 14 is a partial cross-sectional view of a cowl 152', similar to that shown FIG. 11, but extended circumferentially to depict an adjacent cowl, according to an aspect of the present disclosure. As was discussed above with regard to FIG. 3, the cowl 152 extends circumferentially about the longitudinal centerline axis 12', and may be formed of a single cowl structure, or may be formed of multiple cowl structures that are connected together. In addition, as was described above, the cowl 152 includes a plurality of cowl airflow openings corresponding to respective ones of the plurality of swirler assemblies 156. In FIG. 14, an arrangement is shown of the cowl 152' having a structure for adjacent swirler assemblies, including a first swirler assembly 156a (the location of which is shown generally with a dashed circle) and a second swirler assembly 156b (the location of which is also shown generally with a dashed circle). In FIG. 14, the cowl 152' includes a first cowl portion 262 that is defined, at least in part, by a first upstream wall portion 192a, a first cowl outer wall portion 194a, a first cowl inner wall portion 196a, which together define, at least in part a first plenum 154a, and a first cowl airflow opening 157a that provides a flow of compressed air into the first plenum 154a. The cowl 152' also includes a second cowl portion 264 that is defined, at least in part, by a second upstream wall portion 192b, a second cowl outer wall portion 194b, a second cowl inner wall portion 196b, which together define, at least in part, a second plenum 154b, and a second cowl airflow opening 157b that provides a flow of compressed air into the second plenum 154b. The first cowl portion 262 and the second cowl portion 264 may be formed integrally together (i.e., may be a single piece), or may be individual cowl portions that are joined together (e.g., by being brazed together or by being bolted together).

The first cowl outer wall portion 194a includes a first steam channel 199' therewithin, and the second cowl outer wall portion 194b includes a second steam channel 199" therewithin. The first steam channel 199' is in fluid communication with a first mounting arm steam channel portion 202a within a first mounting arm branch 153a of the cowl mounting arm 153, and the second steam channel 199" is in fluid communication with a second mounting arm steam channel portion 202b within a second mounting arm branch 153b of the cowl mounting arm 153. Thus, the cowl mounting arm 153 includes the first mounting arm branch 153a extending to connect with the first cowl portion 262, and includes the second mounting arm branch 153b extending to connect with the second cowl portion 264. In addition, both the first mounting arm steam channel portion 202a and the second mounting arm steam channel portion 202b are in fluid communication with the mounting arm steam channel 202 so as to provide a flow of the steam 114 to the first steam channel 199' and to the second steam channel 199", respectively.

In FIG. 14, a first rib 266 is arranged between the first cowl portion 262 and the second cowl portion 264. The first rib 266 connects the first upstream wall portion 192a and the second upstream wall portion 192b, and extends from the first cowl outer wall portion 194a and the second cowl outer wall portion 194b to the first cowl inner wall portion 196a and the second cowl inner wall portion 196b. The first rib 266 includes a first side 270 and a second side 272, with a first rib steam channel 268 being included within the first rib 266. The first rib steam channel 268 is in fluid communication with at least one of the first steam channel 199' or the second steam channel 199". The first side 270 includes a plurality of first side steam injection nozzles 274 that provide a flow of the steam 114 from the first rib steam channel 268 into the first plenum 154a. Each of the first side steam injection nozzles 274 may be arranged similar to the first rib steam injection nozzles 230 as shown in FIG. 10 and FIG. 11, and may be equally spaced apart from one another in the radial direction R. The second side 272 includes a plurality of second side steam injection nozzles 276 that provide a flow of the steam 114 from the first rib steam channel 268 into the second plenum 154b. Each of the second side steam injection nozzles 276 may be arranged similar to the second rib steam injection nozzles 236 as shown in FIG. 11, and may also be equally spaced apart from one another in the radial direction R. However, as shown in FIG. 14, the first side steam injection nozzles 274 may be offset in the radial direction R with respect to the second side steam injection nozzles 276. For example, an inner-most first side steam injection nozzle 278 may be arranged at a first radial distance 282 with respect to the longitudinal centerline axis 12, while an inner-most second side steam injection nozzle 280 may be arranged at a second radial distance 284 with respect to the longitudinal centerline axis 12, where the second radial distance 284 is greater than the first radial distance 282.

The first cowl portion 262 further includes a second rib 286. The second rib 286 is similar to the first rib 266 and includes a second rib steam channel 288 therewithin that is in fluid communication with the first steam channel 199'. The second rib 286 includes a first side 290 and a second side 292, with the second rib steam channel 288 being arranged between the first side 290 and the second side 292 of the second rib 286. The first side 290 includes a plurality of first side steam injection nozzles 294 that are arranged to provide a flow of the steam 114 from the second rib steam channel 288 into the first plenum 154a. The second side 292 may also include a plurality of second side steam injection nozzles 296 that are arranged to provide a flow of the steam 114 into a plenum of an adjacent cowl portion (not shown, but similar to either the first cowl portion 152a or the second cowl portion 152b).

Similarly, the second cowl portion 264 further includes a second rib 298. The second rib 298 is, again, similar to the first rib 266 and includes a second rib steam channel 300 therewithin that is in fluid communication with the second steam channel 199". The second rib 298 includes a first side 302 and a second side 304, with the second rib steam channel 300 being arranged between the first side 302 and the second side 304 of the second rib 298. The first side 302 includes a plurality of first side steam injection nozzles 306 that are arranged to provide a flow of the steam 114 from the second rib steam channel 300 into the second plenum 154b. The second side 304 may also include a plurality of second side steam injection nozzles 308 that are arranged to provide a flow of the steam 114 into a plenum of an adjacent cowl portion (not shown, but similar to either the first cowl portion 152a or the second cowl portion 152b).

The FIG. 14 aspect may also be implemented in conjunction with any of the aspects shown in, for example, FIG. 4 through FIG. 9. For example, the FIG. 14 aspect may include the outer steam injection nozzles 200 (FIG. 4 and FIG. 5) in the first cowl outer wall portion 194a or in the second cowl outer wall portion 194b. Alternatively, the FIG. 14 aspect may be combined with the FIG. 6 and FIG. 7 aspect to include the inner steam manifold 216 and the inner steam injection nozzles 218. Yet still, the FIG. 14 aspect may be combined with the FIG. 8 and FIG. 9 aspect to include the cowl outer airflow passage steam injection nozzles 222 and the cowl inner airflow passage steam injection nozzles 224. Thus, any of the aspects of FIG. 4 through FIG. 14 can be combined to implement the present disclosure.

Figure 15:
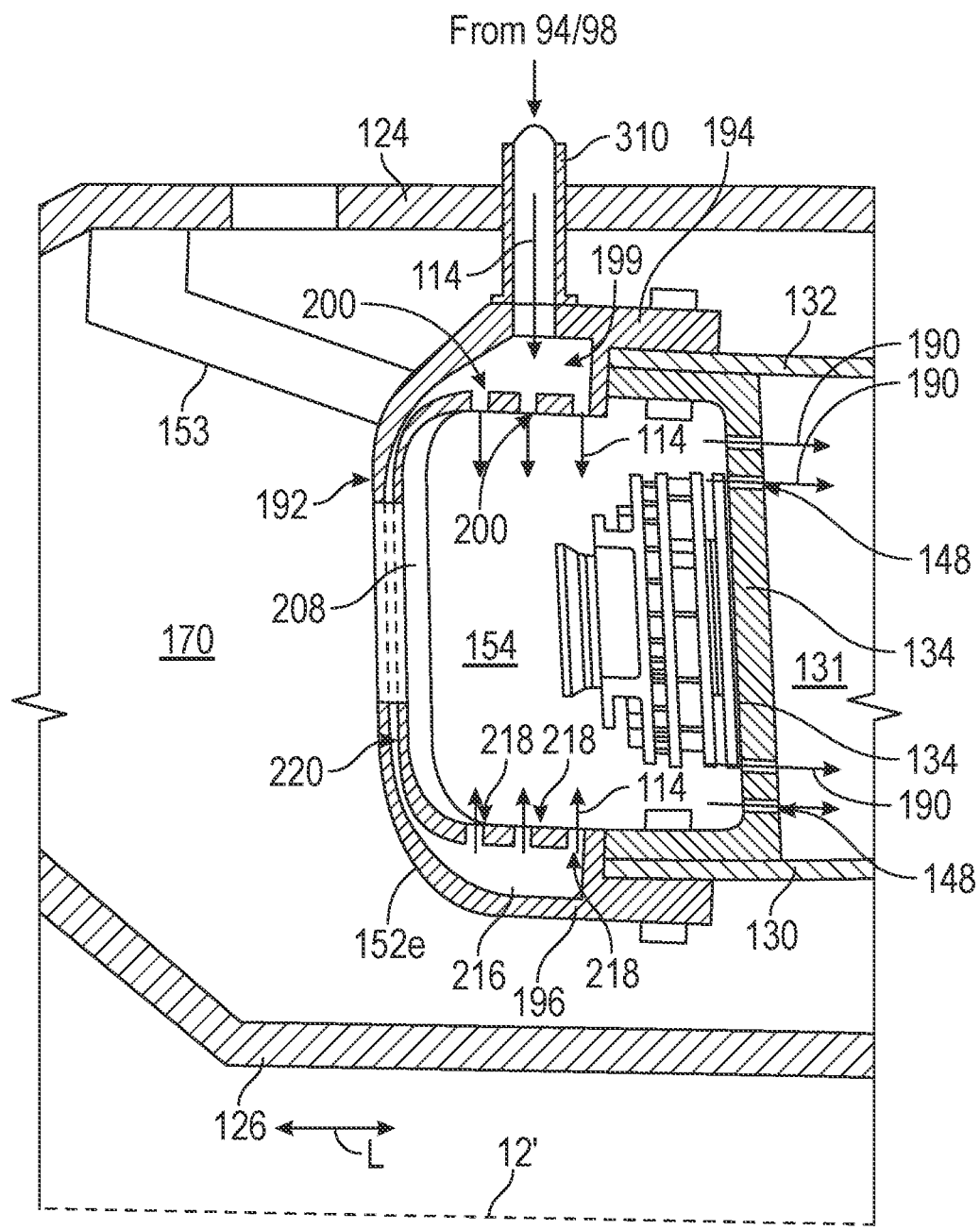
FIG. 15 is a partial cross-sectional view of an alternate cowl to that shown in FIG. 6, according to an aspect of the present disclosure.

FIG. 15 is a partial cross-sectional view of an alternate cowl 152e to that shown in FIG. 6, according to an aspect of the present disclosure. In FIG. 15, elements that are the same as those shown in FIG. 6 include the same reference numerals. Generally, the cowl 152e is the same as the cowl 152a of FIG. 6. One difference between the FIG. 15 aspect and the FIG. 6 aspect, however, is that, in the FIG. 15 aspect, the cowl mounting arm 153 does not include the mounting arm steam channel 202. Rather, a steam supply line 310, which is connected to the combustor steam supply line 98 (FIG. 2) and the steam supply line 94 (FIG. 2), is connected to the cowl outer wall portion 194 of the cowl 152e to provide the flow of steam 114 to the outer steam manifold 199. Of course, the steam supply line 310 may alternatively be connected to the cowl inner wall portion 196 instead, to provide a flow of the steam 114 to the inner steam manifold 216, or the steam supply line 310 may be connected to both the cowl outer wall portion 194 and to the cowl inner wall portion 196. In addition, the steam supply line 310, instead of the mounting arm steam channel 202, may be implemented in any of the aspects depicted in FIG. 4 to FIG. 14.

Figure 16:
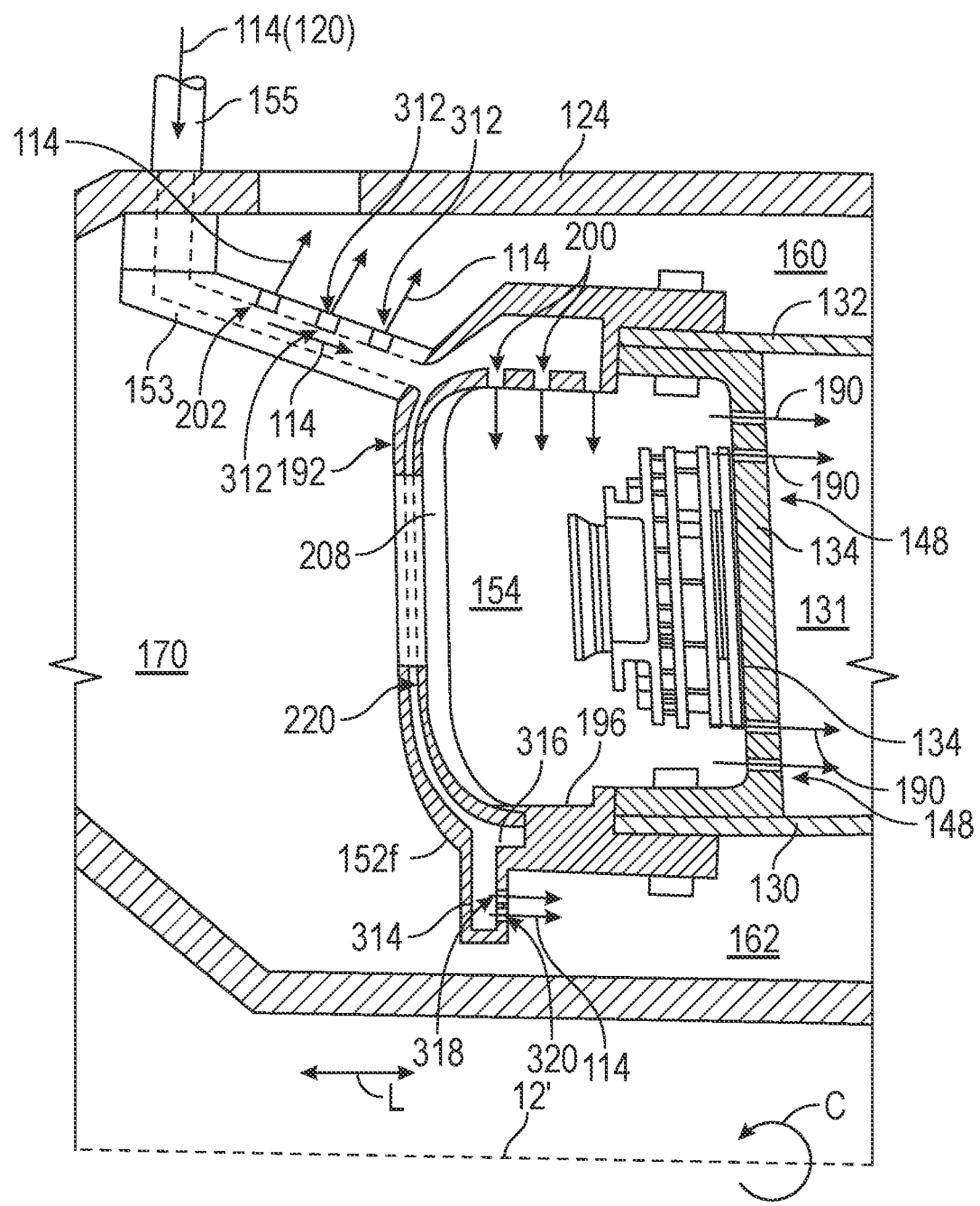
FIG. 16 is a partial cross-sectional view of an alternate cowl to that shown in FIG. 6, according to an aspect of the present disclosure.

FIG. 16 is a partial cross-sectional view of an alternate cowl 152f to that shown in FIG. 6, according to an aspect of the present disclosure. In FIG. 16, elements that are the same as those shown in FIG. 6 include the same reference numerals. In the FIG. 16 aspect, however, the cowl mounting arm 153 includes a plurality of steam injection nozzles 312 that provide a flow of the steam 114 from the mounting arm steam channel 202 into the outer airflow passage 160. In addition, in the FIG. 16 aspect, the cowl inner wall portion 196 includes an inner steam manifold 316 that is in fluid communication with the connecting steam channel 220. Further, the cowl 152e includes an inner airflow passage steam injection extension 314 that extends from the cowl inner wall portion 196 into the inner airflow passage 162. The inner airflow passage steam injection extension 314 includes a steam channel 318 therewithin that is in fluid communication with the inner steam manifold 316, and a plurality of steam injection nozzles 320 that provide a flow of the steam 114 from the steam channel 318 into the inner airflow passage 162. While FIG. 16 depicts one inner airflow passage steam injection extension 314, in the case when multiple cowl portions are arranged adjacent to each other such as was discussed and shown in FIG. 14, each cowl portion may include an inner airflow passage steam injection extension 314 so as to inject steam circumferentially into the inner airflow passage 162.

Figure 17:
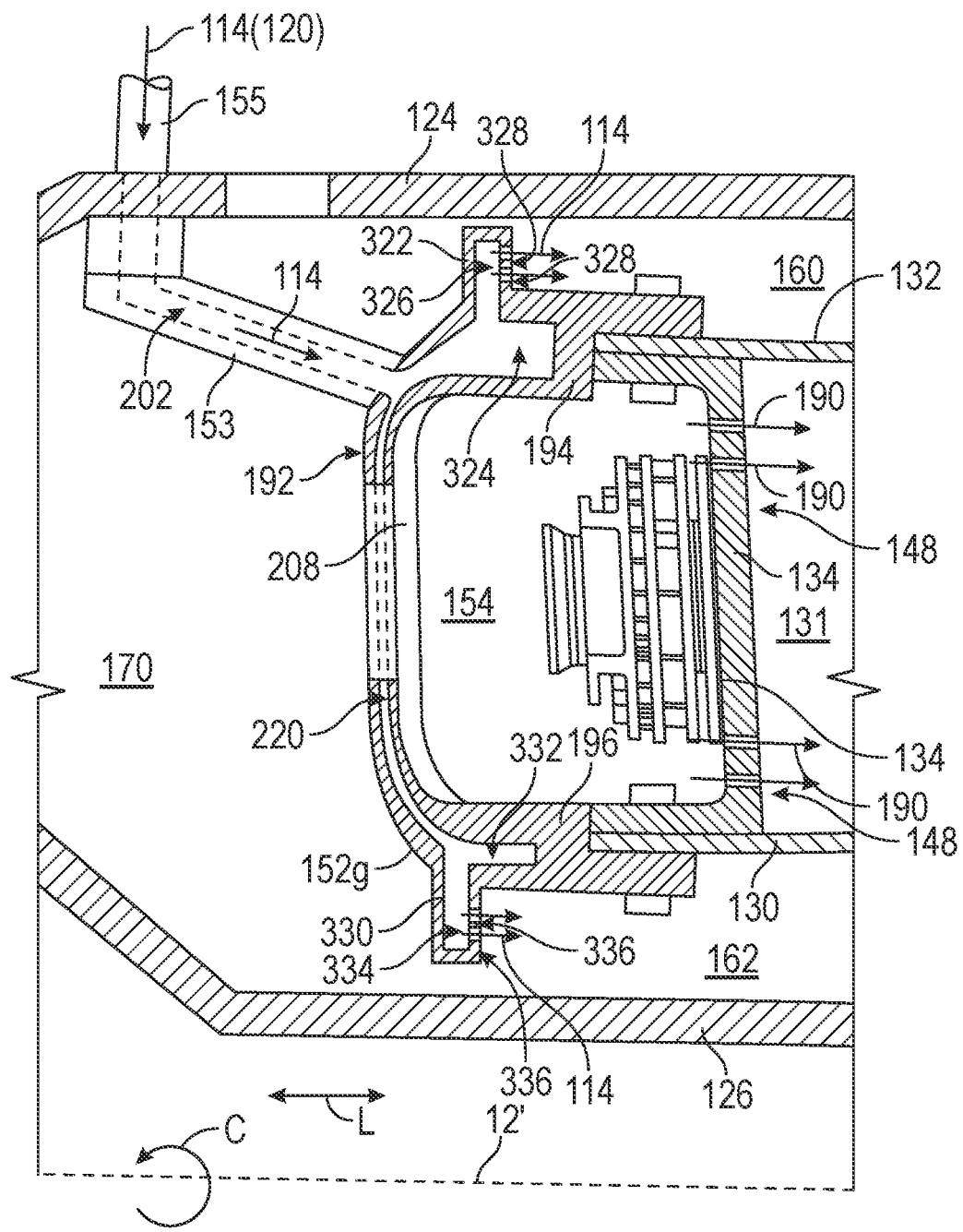
FIG. 17 is a partial cross-sectional view of an alternate cowl to that shown in FIG. 6, according to an aspect of the present disclosure.

FIG. 17 is a partial cross-sectional view of an alternate cowl 152g to that shown in FIG. 6, according to an aspect of the present disclosure. In FIG. 17, elements that are the same as those shown in FIG. 6 include the same reference numerals. In FIG. 17, the cowl 152g includes an outer airflow passage steam injection extension 322 extending from the cowl outer wall portion 194 into the outer airflow passage 160. The cowl outer wall portion 194 includes an outer steam manifold 324 that is in fluid communication with the mounting arm steam channel 202. The outer airflow passage steam injection extension 322 includes a steam channel 326 therewith that is in fluid communication with the outer steam manifold 324, and a plurality of steam injection nozzles 328 that provide a flow of the steam 114 from the steam channel 326 into the outer airflow passage 160. Thus, the steam 114 can be injected from the cowl 152g into the outer airflow passage 160 so that the steam 114 can mix with the compressed air 174 (FIG. 3) in the outer airflow passage 160.

Similarly, the cowl 152g includes an inner airflow passage steam injection extension 330 extending from the cowl inner wall portion 196 into the inner airflow passage 162. The cowl inner wall portion 196 includes an inner steam manifold 332 that is in fluid communication with the connecting steam channel 220. The inner airflow passage steam injection extension 330 includes a steam channel 334 therewithin that is in fluid communication with the inner steam manifold 332, and a plurality of steam injection nozzles 336 that provide a flow of the steam 114 from the steam channel 334 into the inner airflow passage 162. Thus, the steam 114 can be injected from the cowl 152g into the inner airflow passage 162 so that the steam 114 can mix with the compressed air 176 (FIG. 3) in the inner airflow passage 162.

Figure 18:
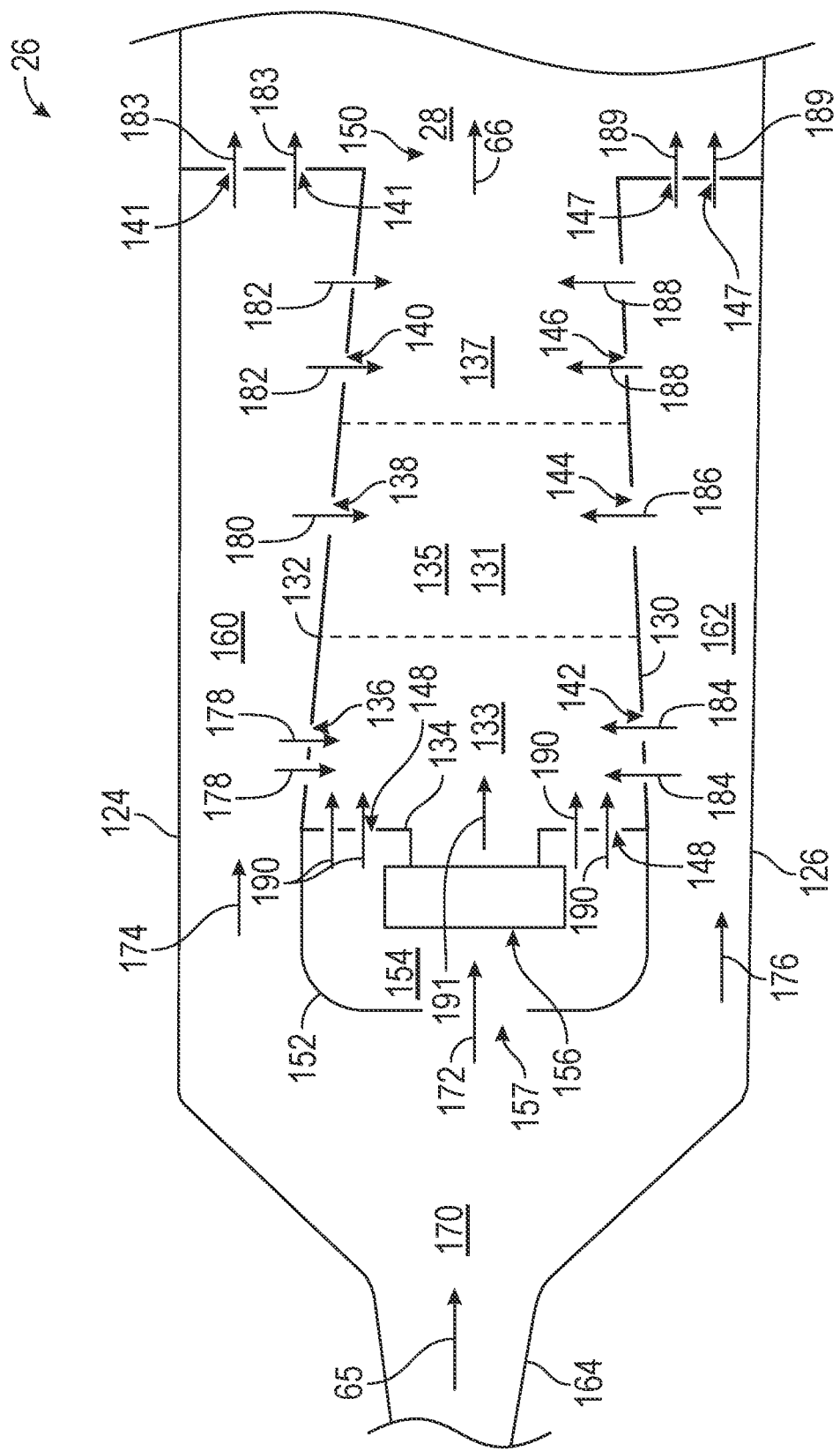
FIG. 18 is a schematic diagram of the combustor of FIG. 3 depicting various airflows through the combustor, according to an aspect of the present disclosure.

FIG. 18 is a schematic diagram of the combustor of FIG. 3 depicting the various airflows through the combustor, according to an aspect of the present disclosure. In FIG. 18, reference numerals corresponding to elements depicted in FIG. 3 are the same as those included in FIG. 3. As shown in FIG. 18, the total incoming airflow into the combustor 26, which may be expressed as Wa3, is the volume of the compressed air 65 through the diffuser 164. The volume of the flow of the compressed air 65 into the combustor 26 may be measured as cubic feet per minute (ft³/min). As was discussed above for FIG. 3, the compressed air 65 flows into the pressure plenum 170 of the combustor 26. A portion of the compressed air 65 in the pressure plenum 170, shown as compressed air 172, flows through the cowl airflow opening 157 of the cowl 152 into the plenum 154. For the present discussion of FIG. 18 and FIG. 19 below, references made to the cowl 152 include any of the cowl 152, the cowl 152a, the cowl 152b, the cowl 152c, the cowl 152d, the cowl 152e, the cowl 152f, the cowl 152g, and the cowl 152'. Another portion of the compressed air 65 in the pressure plenum 170, shown as compressed air 174, flows into the outer airflow passage 160, and still another portion of the compressed air 65 in the pressure plenum 170, shown as compressed air 176, flows into the inner airflow passage 162. As was discussed above, a majority of the compressed air 174 in the outer airflow passage 160 flows through the annular outer liner 132 into the combustion chamber 131, while a lesser portion of the compressed air 174, as the turbine cooling airflow 183, may be routed into the HPT 28 via the airflow openings 141 of the outer casing 124 as was discussed above. Among the airflows flowing through the outer liner 132 into the combustion chamber 131 are the cooling air 178, the dilution air 180, and the cooling air 182. Similarly, a majority of the compressed air 176 in the inner airflow passage 162 flows through the annular inner liner 130 into the combustion chamber 131, while a lesser portion of the compressed air 176 may be routed into the HPT 28, as the turbine cooling airflow 189, via the airflow openings 147 of the inner casing 126. A percentage of the compressed air 174 that is provided as the cooling air 178 through the primary zone cooling openings 136 into a primary combustion zone 133 of the combustion chamber 131 is based on a size and a number of the primary zone cooling openings 136. Similarly, a percentage of the compressed air 176 that is provided as the cooling air 184 through the primary zone cooling openings 142 into the primary combustion zone 133 of the combustion chamber 131 is based on a size and a number of the primary zone cooling openings 142.

Similarly, a percentage of the compressed air 174 that is provided as the cooling air 182 through the secondary zone cooling openings 140 into a secondary combustion zone 137 of the combustion chamber 131, and a percentage of the compressed air 176 that is provided as the cooling air 188 through the secondary zone cooling openings 146 into the secondary combustion zone 137 is based on a size and a number of the secondary zone cooling openings 140 and a size and a number of the secondary zone cooling openings 146.

As was also discussed above, a portion of the compressed air 174 flows through the dilution openings 138 as the dilution airflow 180 into a dilution zone 135 of the combustion chamber 131, and a portion of the compressed air 176 flows through the dilution openings 144 as the dilution airflow 186 into the dilution zone 135. The percentage of the compressed air 174 that is provided as the dilution airflow 180 and the percentage of the compressed air 176 that is provided as the dilution airflow 186 is also dependent on the size and the number of the dilution openings 138 and the size and the number of the dilution openings 144.

In addition, a percentage of the compressed air 172 from the plenum 154 flows through the swirler assemblies 156, where the airflow through the swirler assemblies 156 is mixed with fuel and a fuel/air mixture 191 is injected into the combustion chamber 131, where the fuel/air mixture 191 is ignited and burned to generate the combustion gases 66 (FIG. 3). Further, a percentage of the compressed air 172 in the plenum 154 flows through the cooling airflow openings 148 of the dome structure 134 and into the primary combustion zone 133 of the combustion chamber 131. The percentage of the airflow through the swirler assemblies 156 is based on the design of the swirler assembly 156 (e.g., the number and the size of the swirlers within each swirler assembly 156, and any leakage airflow passages or purge airflow passages associated with each swirler assembly 156), while the percentage of the cooling air 190 provided through the cooling airflow openings 148 of the dome structure 134 is based on a size and a number of the cooling airflow openings 148. The total airflow exiting the combustion chamber 131, which may be expressed as Wa36, is the combustion gases 66, which includes all of the various airflows entering the combustion chamber 131 through the annular outer liner 132, and through the annular inner liner 130, as well as the cooling air 190, and the remnants of the fuel/air mixture 191 that is burned and ignited within the combustion chamber 131.

Figure 19:
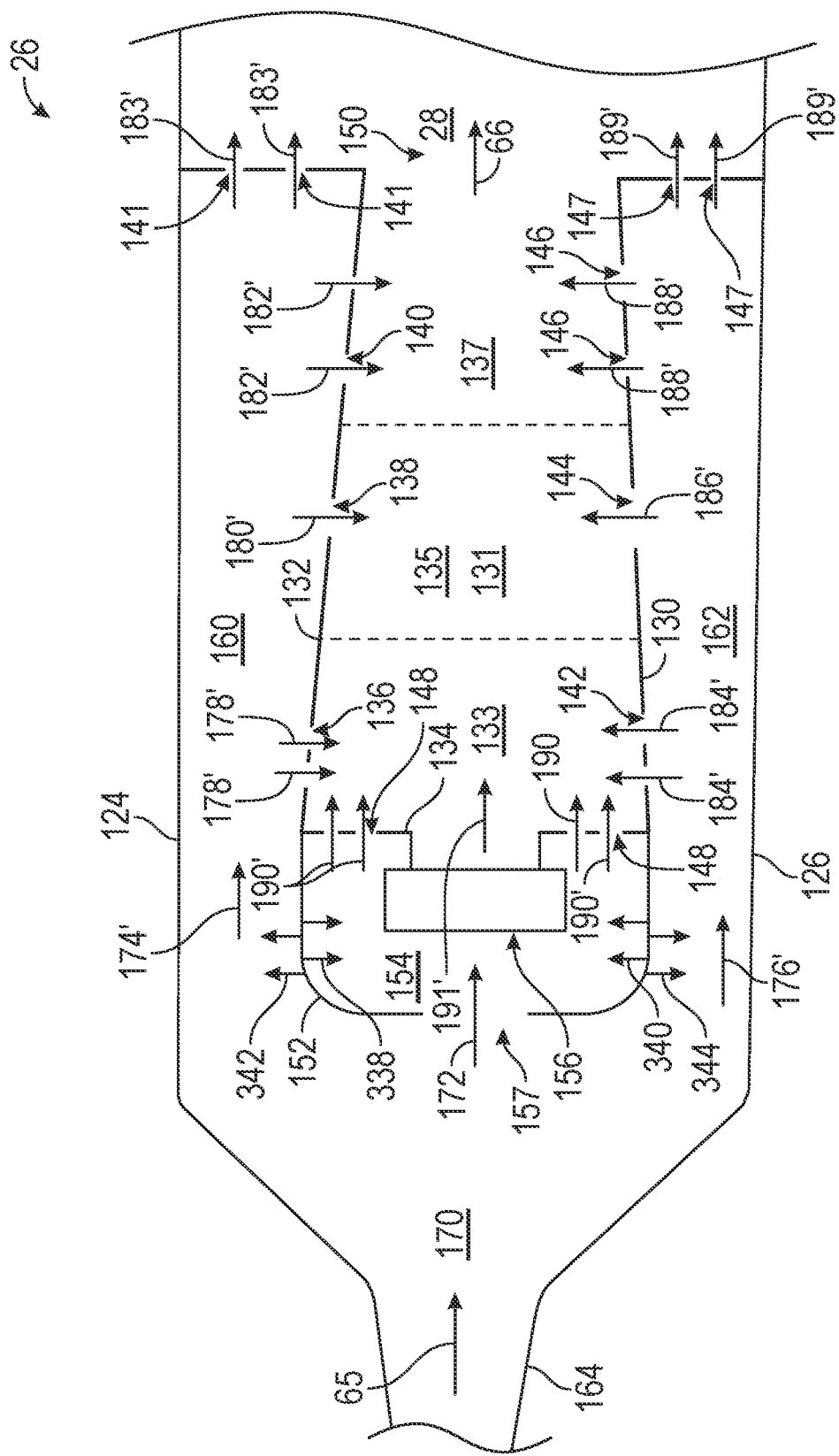
FIG. 19 is a schematic diagram of the combustor similar to that of FIG. 18, but also depicts steam injection within the combustor, according to an aspect of the present disclosure.

FIG. 19 is a schematic diagram of the combustor 26 similar to that of FIG. 18, but also depicts the steam injection within the combustor 26. In particular, steam 338 and steam 340 are general depictions of any of the steam 114 that is injected from the cowl 152 (including the cowl 152a, the cowl 152b, etc.) into the plenum 154. The steam 338 and the steam 340 correspond to any of the steam 114 injected from the cowl 152 (including the cowl 152a, the cowl 152b, etc.) in any of the aspects described above in FIG. 4 through FIG. 17. In addition, steam 342 is a general depiction of any of the steam 114 injected from the cowl 152 (including the cowl 152a, the cowl 152b, etc.) into the outer airflow passage 160, and steam 344 is a general depiction of any of the steam 114 injected from the cowl 152 (including the cowl 152a, the cowl 152b, etc.) into the inner airflow passage 162. The steam 342 may correspond to any of the steam 114 injected from the cowl 152 (including the cowl 152a, the cowl 152b, etc.) into the inner airflow passage 162 in any of the aspects described above in FIG. 4 through FIG. 17. Likewise, the steam 344 may correspond to any of the steam 114 injected from the cowl 152 into the inner airflow passage 162 in any of the aspects described above in FIG. 4 through FIG. 17. The sum of the steam 338, the steam 340, the steam 342, and the steam 344 is the total amount of steam injected into the combustor 26, measured in cubic feet per minute (ft³/min). The steam 338 and the steam 340 injected into the plenum 154 of the cowl 152 mixes with the compressed air 172 before flowing through the swirler assemblies 156 as a swirler fuel/air/steam mixture 191', and through the cooling airflow openings 148 of the dome structure 134 as a steam/air mixture 190'. A percentage of the steam 338, 340 versus a percentage of the compressed air 172 in the mixture may be referred to as a water-to-air ratio, which may be varied based on the amount of steam 338, 340 injected into the plenum 154 to obtain a desired water-to-air ratio.

Similarly, the steam 342 mixes with the compressed air 174 in the outer airflow passage 160 to generate a steam/air mixture 174'. The amount of the steam 342 versus the amount of the compressed air 174 also results in a water-to-air ratio of the steam/air mixture 174' that can be varied so as to provide a desired amount of the steam versus air into the combustion chamber 131 via any of the airflow openings through the annular outer liner 132. For example, a portion of the steam/air mixture 174' flows through the primary zone cooling openings 136 so as to inject a steam/air mixture 178' into the combustion chamber 131. Another portion of the steam/air mixture 174' flows through the dilution openings 138 as a steam/air mixture 180'. Yet another portion of the steam/air mixture 174' flows through the secondary zone cooling openings 140 as a steam/air mixture 182'. Finally, still another portion of the steam/air mixture 174' flows through the airflow openings 141 of the outer casing 124 as a steam/air mixture 183'.

Likewise, the steam 344 mixes with the compressed air 176 in the inner airflow passage 162 to generate a steam/air mixture 176'. The amount of the steam 344 versus the amount of the compressed air 176 also results in a water-to-air ratio of the steam/air mixture 176' that can be varied so as to provide a desired amount of the steam versus air into the combustion chamber 131 via any of the airflow openings through the annular inner liner 130. For example, a portion of the steam/air mixture 176' flows through the primary zone cooling openings 142 so as to inject a steam/air mixture 184' into the combustion chamber 131. Another portion of the steam/air mixture 176' flows through the dilution openings 144 as a steam/air mixture 186'. Yet another portion of the steam/air mixture 176' flows through the secondary zone cooling openings 146 as a steam/air mixture 188'. Finally, still another portion of the steam/air mixture 176' flows through the airflow openings 147 of the inner casing 126 as a steam/air mixture 189'. The combustor 26 may be designed to provide the following water-to-air ratios, and steam ratios.

The total steam injected into the combustor 26 may be expressed as $Wsteam_{total}$ which is the sum of the steam 338, the steam 340, the steam 342, and the steam 344. The steam injected into the cowl 152 may be expressed as $Wsteam_{cowl}$, which is the sum of the steam 338 and the steam 340. The steam injected from the cowl 152 into the outer airflow passage 160 may be expressed as $Wsteam_{outer}$, which is the steam 342, and the steam injected from the cowl 152 into the inner airflow passage 162 may be expressed as $Wsteam_{inner}$, which is the steam 344. Thus the total steam may be expressed as the following:

$$Wsteam_{total} = Wsteam_{cowl} + Wsteam_{outer} + Wsteam_{inner}$$

A total water-to-air ratio ($WAR_{total}$) of the combustor 26 may be expressed as follows:

$WAR_{total} = Wsteam_{total}/Wa3$, where $WAR_{total}$, and may have a range from 0.1 percent to sixty (60) percent.

The percentage of steam injected from the cowl 152 ($Wsteam_{cowl}$) into the plenum 154, as percentage of the total steam injected into the combustor 26 ($Wsteam_{total}$), may be expressed as:

$Wsteam_{cowl}/Wsteam_{total}$, which may have a range from zero (0) percent to fifty (50) percent.

The percentage of the steam injected into the outer flow passage 160 ($Wsteam_{outer}$), as a percentage of the total steam ($Wsteam_{total}$) injected into the combustor 26, may be expressed as:

$Wsteam_{outer}/Wsteam_{total}$, and may have a range from 0.1 percent to one-hundred (100) percent.

The percentage of the steam injected into the inner airflow passage 162 ($Wsteam_{inner}$), as a percentage of the total steam ($Wsteam_{total}$) injected into the combustor 26, may be expressed as:

$Wsteam_{inner}/Wsteam_{total}$, and may have a range from 0.1 percent to one-hundred (100) percent.

A water-to-air ratio (WAR) of the steam 338 and the steam 340 injected into the cowl 152 to the total air (Wa3) injected into the combustor 26 may be expressed as:

$WAR_{cowl} = Wsteam_{cowl}/Wa3$, which may have a range between zero (0) percent to thirty (30) percent.

A water-to-air ratio (WAR) of the steam 342 injected into the outer flow passage 160 as a percentage of the total air (Wa3) injected into the combustor 26 may be referred to as $WAR_{outer}$ and expressed as:

$WAR_{outer} = Wsteam_{outer}/Wa3$, and may have a range from 0.1 percent to sixty (60) percent.

A water-to-air ratio (WAR) of the steam 344 injected into the inner airflow passage 162 as a percentage of the total air (Wa3) injected into the combustor 26 may be referred to as $WAR_{inner}$ and expressed as:

$WAR_{inner} = Wsteam_{inner}/Wa3$, and may have a ranged from 0.1 percent to sixty (60) percent.

Next, a distribution (split) of the steam 338 and the steam 340 injected from the cowl 152 into the plenum 154 that flows into the combustion chamber 131 via the swirler assemblies 156 and via the cooling airflow openings 148 in the dome structure 134 will be described. The total steam ($Wsteam_{cowl}$) injected into the plenum is the steam 338 and the steam 340. A percentage of the total steam $Wsteam_{cowl}$ that flows through the swirler assembly 156 is $Wsteam_{swirler}$, and may be expressed as:

$Wsteam_{swirler}/Wsteam_{cowl}$, which may have a range from five (5) percent to ninety-five (95) percent of the $Wsteam_{cowl}$.

The remaining portion of the steam $Wsteam_{cowl}$ within the plenum 154 flows through the cooling airflow openings 148 and may be expressed as $Wsteam_{dome}$, and may be expressed as:

$$Wsteam_{dome} = 1 - Wsteam_{swirler}$$

Next, a distribution (split) of the steam 342 and the steam 344 injected from the cowl 152 into the outer flow passage 160 and into the inner airflow passage 162 that flows into the combustion chamber 131 via the various openings in the annular outer liner 132 and the annular inner liner 130 will be described. The total steam injected into the primary combustion zone 133 of the combustion chamber 131 may be referred to as $Wsteam_{prim\ zone}$ and is a function of the steam injected from the cowl 152 into the plenum 154 ($Wsteam_{cowl}$) and the steam injected into the primary combustion zone 133 as the steam/air mixture 178' via the primary zone cooling openings 136 of the annular outer liner 132, and the steam injected into the primary combustion zone 133 as the steam/air mixture 184' via the primary zone cooling openings 142 of the annular inner liner 130. The total steam injected as the steam/air mixture 178' and the steam/air mixture 184' may be referred to as $Wsteam_{cooling\ prim}$. Thus, the total steam injected into the primary combustion zone 133 may be expressed as:

$$Wsteam_{prim\ zone} = Wsteam_{cowl} + Wsteam_{cooling\ prim}$$

A ratio of the steam injected into the primary combustion zone 133 ($Wsteam_{prim\ zone}$) to the total steam ($Wsteam_{total}$) injected into the combustor 26 may be expressed as:

$Wsteam_{prim\ zone}/Wsteam_{total}$, which may have a range from zero (0) percent to sixty (60) percent.

The total steam injected into a secondary zone, which includes the dilution zone 135 and the secondary combustion zone 137 of the combustion chamber 131 may be referred to as $Wsteam_{secondary\ zone}$ and is a function of the total steam injected into the dilution zone 135 ($Wsteam_{dilution}$) as the steam/air mixture 180' ($Wsteam_{outer\ dilution}$) and the steam/air mixture 186' ($Wsteam_{inner\ dilution}$)(where $Wsteam_{dilution} = Wsteam_{outer\ dilution} + Wsteam_{inner\ dilution}$) and the total steam injected into the secondary combustion zone 133 ($Wsteam_{cooling\ secondary}$) as the steam/air mixture 178' ($Wsteam_{outer\ cooling\ secondary}$) via the primary zone cooling openings 136 of the annular outer liner 132, and the steam injected into the primary combustion zone 133 as the steam/air mixture 184' ($Wsteam_{inner\ cooling\ secondary}$) via the primary zone cooling openings 142 of the annular inner liner 130. Thus, the total steam injected into the secondary zone ($Wsteam_{secondary\ zone}$) may be expressed as:

$Wsteam_{secondary\ zone} = Wsteam_{dilution} + Wsteam_{cooling\ secondary}$, or as $Wsteam_{secondary\ zone} = (Wsteam_{outer\ dilution} + Wsteam_{inner\ dilution}) + (Wsteam_{outer\ cooling\ secondary} + Wsteam_{inner\ cooling\ secondary})$.

As a ratio of the total steam injected into the secondary zone ($Wsteam_{secondary\ zone}$) to the total steam ($Wsteam_{total}$) injected into the combustor 26 may be expressed as:

$Wsteam_{secondary\ zone}/Wsteam_{total}$, which may have a range from zero (0) percent to one hundred (100) percent.

Next, a distribution of the total steam that flows into the HPT 28 ($Wsteam_{turbine\ total}$) will be discussed. The total steam to the turbine ($Wsteam_{turbine\ total}$) is a function of the steam injected into the primary combustion zone 133 ($Wsteam_{prim\ zone}$), the steam injected into the secondary zone ($Wsteam_{secondary\ zone}$) of the combustion chamber 131, along with the steam flowing into the HPT 28 ($Wsteam_{turbine}$) included in the steam/air mixture 183' and the steam/air mixture 189'. A percentage of the steam ($Wsteam_{turbine}$) to the total steam to the turbine ($Wsteam_{turbine\ total}$) may be expressed as:

$Wsteam_{turbine}/Wsteam_{turbine\ total}$, which may have a range from 0.1 percent to one hundred (100) percent.

For one hundred (100) percent, the steam may only be provided from the cowl 152 into the outer flow passage 160 and to the inner airflow passage 162, without any steam being injected into the plenum 154, and without steam being injected into the combustion chamber 131 via any of the airflow passages through the annular outer liner 132 or through the annular inner liner 130.

A water-to-air ratio for the HPT 28 ($WAR_{turbine}$) is a function of the total steam provided to the HPT 28 ($Wsteam_{turbine\ total}$) and the total air input to the combustor 26 (Wa3), and may be expressed as:

$WAR_{turbine} = Wsteam_{turbine\ total}/Wa3$, and may have a range from zero (0) percent to sixty (60) percent. For sixty (60) percent, the steam from the cowl 152 can be exhausted directly into the HPT 28 and not in the liners of the combustor 26.

In another aspect, instead of a water-to-air ratio, the steam split in the combustor 26 can be expressed as a steam-to-fuel ratio (SFR), which can be expressed as:

$SFR = Wsteam_{total}/Wf36$, where Wf36 is the total fuel injected into the combustor 26. A fuel-to-air ratio (FAR) can be expressed as:

$FAR = Wf36/Wa36$, which is a function of the total fuel injected into the combustor 26 to the total air exiting the combustor 26. Thus, the total water-to-air ratio of the combustor 26 (WAR3) can be expressed as:

$WAR3 = SFR*FAR*(Wa36/Wa3)$.

The foregoing arrangements provide for the injection of steam from the cowl into either the plenum under the cowl surrounding the swirler assembly, or into the outer or inner airflow passages surrounding the combustor liner. The steam injected into the cowl can mix with the compressed air within the plenum and flow through either the swirler assembly or through the cooling passages in the dome assembly and into the combustion chamber. The steam injected into the outer airflow passage can mix with the compressed air flowing in the outer airflow passage and then through the primary zone cooling openings, the dilution openings, and the secondary zone cooling openings of the outer liner into the combustion chamber. Similarly, the steam injected into the inner airflow passage can mix with the air flowing in the inner airflow passage and then through the primary zone cooling openings, the dilution openings, and the secondary zone cooling openings of the inner liner into the combustion chamber. By virtue of the foregoing, NOx and CO emissions from the combustor can be reduced.

While the foregoing description relates generally to a gas turbine engine, the gas turbine engine may be implemented in various environments. For example, the engine may be implemented in an aircraft, but may also be implemented in non-aircraft applications, such as power generating stations, marine applications, or oil and gas production applications. Thus, the present disclosure is not limited to use in aircraft.

Further aspects of the present disclosure are provided by the subject matter of the following clauses.

A combustor for an aircraft gas turbine engine, the combustor including a dome structure, a swirler assembly connected to the dome structure, and a cowl connected to the dome structure and defining a plenum between the dome structure and the cowl, and surrounding the swirler assembly, the cowl including an airflow opening through an upstream wall portion of the cowl for providing a flow of compressed air into the plenum, wherein the cowl includes a cowl steam channel therewithin and a plurality of steam injection nozzles that provide a flow of steam from the cowl steam channel into the plenum.

The combustor according to the preceding clause, wherein the cowl further includes at least one cowl mounting arm mounting the cowl to a combustor casing, the at least one cowl mounting arm including a mounting arm steam channel in fluid communication with the cowl steam channel.

The combustor according to any preceding clause, wherein the cowl includes a cowl outer wall portion extending downstream from an outer end of the upstream wall portion and a cowl inner wall portion extending downstream from an inner end of the upstream wall portion, and the cowl steam channel includes at least one of an outer steam manifold within the cowl outer wall portion or an inner steam manifold within the cowl inner wall portion.

The combustor according to any preceding clause, wherein the plurality of steam injection nozzles includes at least one outer steam injection nozzle providing a flow of steam into the plenum from the outer steam manifold or at least one inner steam injection nozzle providing a flow of steam into the plenum from the inner steam manifold.

The combustor according to any preceding clause, wherein the cowl includes at least one of a first rib on a first circumferential side of the upstream wall portion and extending between the cowl outer wall portion and the cowl inner wall portion, or a second rib on a second circumferential side of the upstream wall portion and extending between the cowl outer wall portion and the cowl inner wall portion, the cowl steam channel extending within at least one of the first rib or the second rib, and the plurality of steam injection nozzles being provided in at least one of the first rib or the second rib and providing the flow of steam therethrough into the plenum.

The combustor according to any preceding clause, wherein the plurality of steam injection nozzles includes at least one first rib steam injection nozzle in the first rib providing a flow of steam into the plenum or at least one second rib steam injection nozzle in the second rib providing a flow of steam into the plenum.

The combustor according to any preceding clause, wherein the combustor further comprises a second swirler assembly connected to the dome structure circumferentially adjacent to the swirler assembly, and the cowl further includes a second upstream wall portion, a second outer wall portion, and a second inner wall portion and defines a second plenum between the dome structure and the cowl and surrounding the second swirler assembly, the cowl including a second airflow opening through the second upstream wall portion for providing a flow of compressed air into the second plenum, and the cowl further includes a rib arranged between the upstream wall portion and the second upstream wall portion, the cowl steam channel extending through the rib and the plurality of steam injection nozzles including at least one rib steam injection nozzle included in the rib.

The combustor according to any preceding clause, wherein the at least one rib steam injection nozzle includes at least one first side steam injection nozzle arranged on a first side of the rib and providing a flow of steam into the plenum, and at least one second side steam injection nozzle arranged on a second side of the rib opposite the first side of the rib and providing a flow of steam into the second plenum.

The combustor according to any preceding clause, wherein the at least one first side steam injection nozzle and the at least one second side steam injection nozzle are radially offset from one another in a radial direction with respect to a combustor centerline axis.

The combustor according to any preceding clause, wherein at least one of the first rib or the second rib includes an outer longitudinal rib portion extending at least partially along the cowl outer wall portion, and an inner longitudinal rib portion extending at least partially along the cowl inner wall portion, at least one of the outer longitudinal rib portion or the inner longitudinal rib portion including, as part of the cowl steam channel, a steam channel extending within the outer longitudinal rib portion or the inner longitudinal rib portion, and at least one of the outer longitudinal rib portion or the inner longitudinal rib portion includes at least one steam injection nozzle arranged to inject steam into the plenum.

The combustor according to any preceding clause, wherein the combustor further includes an outer liner connected to the dome structure, an inner liner connected to the dome structure, wherein the outer liner, the inner liner, and the dome structure define a combustion chamber, an outer casing arranged radially outward of the outer liner, the dome structure, and the cowl, and defining an outer airflow passage between the outer casing and the outer liner, an inner casing arranged radially inward of the inner liner, the dome structure and the cowl, and defining an inner airflow passage between the inner casing and the inner liner, and a diffusor connecting an upstream end of the outer casing and an upstream end of the inner casing, a pressure plenum being defined between the diffusor, the upstream end of the outer casing, and the upstream end of the inner casing, the pressure plenum being in fluid communication with the outer airflow passage and with the inner airflow passage, the diffusor providing a flow of compressed air therethrough into the pressure plenum.

The combustor according to any preceding clause, wherein the cowl includes a cowl outer wall portion extending downstream from an outer end of the upstream wall portion and a cowl inner wall portion extending downstream from an inner end of the upstream wall portion, and the cowl steam channel includes an outer steam manifold within the cowl outer wall portion, an inner steam manifold within the cowl inner wall portion, and a connecting steam channel connecting the outer steam manifold and the inner steam manifold, the plurality of steam injection nozzles includes (a) at least one outer steam injection nozzle providing a flow of steam into the plenum from the outer steam manifold, (b) at least one inner steam injection nozzle providing a flow of steam into the plenum from the inner steam manifold, (c) at least one outer airflow passage steam injection nozzle arranged to provide a flow of steam from the outer steam manifold into at least one of the pressure plenum or the outer airflow passage, and (d) at least one inner airflow passage steam injection nozzle arranged to provide a flow of steam from the inner steam manifold into at least one of the pressure plenum or the inner airflow passage.

The combustor according to any preceding clause, wherein the cowl further includes at least one cowl mounting arm mounting the cowl to one of the outer casing or the inner casing, the at least one cowl mounting arm including a mounting arm steam channel in fluid communication with the cowl steam channel, and the at least one cowl mounting arm including at least one mounting arm steam injection nozzle providing a flow of steam from the mounting arm steam channel into at least one of the pressure plenum, the outer airflow passage, or the inner airflow passage.

The combustor according to any preceding clause, wherein the combustion chamber includes a primary combustion zone, a dilution zone, and a secondary combustion zone.

The combustor according to any preceding clause, wherein at least one of the outer liner or the inner liner includes a plurality of primary zone cooling openings therethrough providing a flow of cooling air or a flow of a steam/air mixture therethrough to the primary combustion zone of the combustion chamber.

The combustor according to any preceding clause, wherein at least one of the outer liner or the inner liner includes a plurality of dilution openings therethrough providing a flow of dilution air or a flow of a steam/air mixture therethrough to the dilution zone of the combustion chamber.

The combustor according to any preceding clause, wherein at least one of the outer liner or the inner liner includes a plurality of secondary zone cooling openings therethrough providing a flow of cooling air or a flow of a steam/air mixture therethrough to the secondary combustion zone of the combustion chamber.

The combustor according to any preceding clause, wherein the dome structure includes a plurality of cooling airflow openings therethrough providing a flow of cooling air or a flow of a steam/air mixture therethrough to the primary combustion zone of the combustion chamber.

The combustor according to any preceding clause, wherein at least one of the outer casing or the inner casing includes a plurality of turbine airflow openings providing a flow of cooling air or a flow of a steam/air mixture therethrough to the turbine section.

The combustor according to any preceding clause, wherein the swirler assembly provides a flow of an air/fuel/steam mixture into the primary combustion zone of the combustion chamber.

The combustor according to any preceding clause, wherein a total amount of steam flow ($Wsteam_{total}$) includes a steam provided from the cowl into the plenum ($Wsteam_{cowl}$) plus the amount of steam provided from the cowl into the outer flow passage ($Wsteam_{outer}$) plus the amount of steam provided from the cowl into the inner flow passage ($Wsteam_{inner}$).

The combustor according to any preceding clause, wherein a total amount of air provided to the combustor from the compressor section is Wa3, and a water-to-air ratio ($WAR_{total}$) is $Wsteam_{total}$/Wa3, and may have a range from 0.1 percent to sixty percent.

The combustor according to any preceding clause, wherein a ratio the total amount of steam provided to the plenum ($Wsteam_{cowl}$) to the total amount of steam provided to the combustor ($Wsteam_{total}$) is $Wsteam_{cowl}$/$Wsteam_{total}$ and may have a range from zero percent to fifty percent.

The combustor according to any preceding clause, wherein a ratio of the steam provided to the outer flow passage ($Wsteam_{outer}$) to the total steam provided to the combustor ($Wsteam_{total}$) is $Wsteam_{outer}$/$Wsteam_{total}$ and may have a range from 0.1 percent to one-hundred percent.

The combustor according to any preceding clause, wherein a ratio of the steam provided to the inner flow passage ($Wsteam_{inner}$) to the total steam provided to the combustor ($Wsteam_{total}$) is $Wsteam_{inner}$/$Wsteam_{total}$ and may have a range from 0.1 percent to one-hundred percent.

The combustor according to any preceding clause, wherein a water-to-air ratio ($WAR_{cowl}$) of the steam provided to the plenum ($Wsteam_{cowl}$) to the total amount of air provided to the combustor (Wa3) is $Wsteam_{cowl}$/Wa3, and may have a range from zero percent to thirty percent.

The combustor according to any preceding clause, wherein a water-to-air ratio ($WAR_{outer}$) of the steam provided to the outer flow passage($Wsteam_{outer}$) to the total amount of air provided to the combustor (Wa3) is $Wsteam_{outer}$/Wa3, and may have a range from 0.1 percent to sixty percent.

The combustor according to any preceding clause, wherein a water-to-air ratio ($WAR_{inner}$) of the steam provided to the inner flow passage($Wsteam_{inner}$) to the total amount of air provided to the combustor (Wa3) is $Wsteam_{inner}$/Wa3, and may have a range from 0.1 percent to sixty percent.

The combustor according to any preceding clause, wherein a ratio of the steam provided to the plenum ($Wsteam_{cowl}$) to the amount of steam flowing through the swirler assembly ($Wsteam_{swirler}$) is $Wsteam_{swirler}$/$Wsteam_{cowl}$, and may have a range from five percent to ninety-five percent.

The combustor according to any preceding clause, wherein a ratio of the steam provided to the plenum ($Wsteam_{cowl}$) to the amount of steam flowing through the dome structure ($Wsteam_{dome}$) is $Wsteam_{dome}$=1−$Wsteam_{swirler}$.

The combustor according to any preceding clause, wherein a total amount of steam provided to the primary combustion zone of the combustion chamber ($Wsteam_{prim\ zone}$) is the total amount of steam provided through the swirler assemblies ($Wsteam_{swirler}$), plus the total amount of steam provided through the dome ($Wsteam_{dome}$), plus the total amount of steam provided through the primary zone cooling openings ($Wsteam_{cooling\ prim}$).

The combustor according to any preceding clause, wherein a ratio of the total amount of steam provided to the primary combustion zone ($Wsteam_{prim\ zone}$) to the total amount of steam ($Wsteam_{total}$) injected into the combustor is $Wsteam_{prim\ zone}$/$Wsteam_{total}$, and may have a range from zero percent to sixty percent.

The combustor according to any preceding clause, wherein a ratio of the total amount of steam provided to the dilution zone and to the secondary combustion zone ($Wsteam_{secondary\ zone}$) to the total amount of steam ($Wsteam_{total}$) injected into the combustor is $Wsteam_{secondary\ zone}$/$Wsteam_{total}$, and may have a range from zero percent to one-hundred percent.

The combustor according to any preceding clause, wherein a water-to air ratio of amount of the steam provided to the turbine section ($Wsteam_{turbine}$) to the total airflow in the combustor (Wa3) is $Wsteam_{turbine}$/Wa3 and may have a range from zero percent to sixty percent.

A gas turbine engine for an aircraft, the gas turbine engine including a compressor section, a combustor arranged in serial flow relationship with the compressor section, a turbine section arranged in serial flow relationship with the combustor, a steam turbine arranged in serial flow relationship with the turbine section, an exhaust section arranged in serial flow relationship with the steam turbine, and a steam generation system arranged at least partially within the exhaust section, the steam generation system being configured to generate steam, deliver a flow of steam to the steam turbine, and to provide a flow of steam to the combustor, wherein the combustor includes (a) a dome structure, (b) a swirler assembly connected to the dome structure, and (c) a cowl connected to the dome structure and defining a plenum between the dome structure and the cowl, and surrounding the swirler assembly, the cowl including an airflow opening through an upstream wall portion of the cowl for providing a flow of compressed air from the compressor section into the plenum, wherein the cowl includes a cowl steam channel therewithin and a plurality of steam injection nozzles that provide a flow of steam provided by the steam generation system from the cowl steam channel into the plenum.

The gas turbine engine according to the preceding clause, wherein the steam generation system includes a boiler arranged in the exhaust section, a condenser, a water/exhaust separator, a water storage tank arranged to receive water from the water/exhaust separator and arranged to provide a supply of water to the boiler, and a steam supply line that provides a flow of steam to the steam turbine, a combustor steam supply line arranged to provide a flow of steam from the steam generation system to the combustor.

The gas turbine engine according to any preceding clause, wherein the cowl includes a cowl outer wall portion extending downstream from an outer end of the upstream wall portion and a cowl inner wall portion extending downstream from an inner end of the upstream wall portion, and the cowl steam channel includes at least one of an outer steam manifold within the cowl outer wall portion or an inner steam manifold within the cowl inner wall portion, and wherein the plurality of steam injection nozzles includes at least one outer steam injection nozzle providing a flow of steam into the plenum from the outer steam manifold or at least one inner steam injection nozzle providing a flow of steam into the plenum from the inner steam manifold.

The gas turbine engine according to any preceding clause, wherein the combustor further includes an outer liner connected to the dome structure, an inner liner connected to the dome structure, wherein the outer liner, the inner liner, and the dome structure define a combustion chamber, an outer casing arranged radially outward of the outer liner, the dome structure, and the cowl, and defining an outer airflow passage between the outer casing and the outer liner, an inner casing arranged radially inward of the inner liner, the dome structure and the cowl, and defining an inner airflow passage between the inner casing and the inner liner, and a diffusor connecting an upstream end of the outer casing and an upstream end of the inner casing, a pressure plenum being defined between the diffusor, the upstream end of the outer casing, and the upstream end of the inner casing, the pressure plenum being in fluid communication with the outer airflow passage and with the inner airflow passage, the diffusor providing a flow of compressed air therethrough into the pressure plenum.

The gas turbine engine according to any preceding clause, wherein the cowl includes a cowl outer wall portion extending downstream from an outer end of the upstream wall portion and a cowl inner wall portion extending downstream from an inner end of the upstream wall portion, and the cowl steam channel includes an outer steam manifold within the cowl outer wall portion, an inner steam manifold within the cowl inner wall portion, and a connecting steam channel connecting the outer steam manifold and the inner steam manifold, the plurality of steam injection nozzles includes (a) at least one outer steam injection nozzle providing a flow of steam into the plenum from the outer steam manifold, (b) at least one inner steam injection nozzle providing a flow of steam into the plenum from the inner steam manifold, (c) at least one outer airflow passage steam injection nozzle arranged to provide a flow of steam from the outer steam manifold into at least one of the pressure plenum or the outer airflow passage, and (d) at least one inner airflow passage steam injection nozzle arranged to provide a flow of steam from the inner steam manifold into at least one of the pressure plenum or the inner airflow passage.

The gas turbine engine according to any preceding clause, wherein the combustor further comprises a second swirler assembly connected to the dome structure circumferentially adjacent to the swirler assembly, and the cowl further includes a second upstream wall portion, a second outer wall portion, and a second inner wall portion and defines a second plenum between the dome structure and the cowl, and surrounding the second swirler assembly, the cowl including a second airflow opening through the second upstream wall portion for providing a flow of compressed air into the second plenum, and the cowl further includes a rib arranged between the upstream wall portion and the second upstream wall portion, the cowl steam channel extending through the rib and the plurality of steam injection nozzles including at least one rib steam injection nozzle included in the rib.

The gas turbine engine according to any preceding clause, wherein the at least one rib steam injection nozzle includes at least one first side steam injection nozzle arranged on a first side of the rib and providing a flow of steam into the plenum, and at least one second side steam injection nozzle arranged on a second side of the rib opposite the first side of the rib and providing a flow of steam into the second plenum.

The gas turbine engine according to any preceding clause, wherein the combustion chamber includes a primary combustion zone, a dilution zone, and a secondary combustion zone.

The gas turbine engine according to any preceding clause, wherein at least one of the outer liner or the inner liner includes a plurality of primary zone cooling openings therethrough providing a flow of cooling air or a flow of a steam/air mixture therethrough to the primary combustion zone of the combustion chamber.

The gas turbine engine according to any preceding clause, wherein at least one of the outer liner or the inner liner includes a plurality of dilution openings therethrough providing a flow of dilution air or a flow of a steam/air mixture therethrough to the dilution zone of the combustion chamber.

The gas turbine engine according to any preceding clause, wherein at least one of the outer liner or the inner liner includes a plurality of secondary zone cooling openings therethrough providing a flow of cooling air or a flow of a steam/air mixture therethrough to the secondary combustion zone of the combustion chamber.

The gas turbine engine according to any preceding clause, wherein the dome structure includes a plurality of cooling airflow openings therethrough providing a flow of cooling air or a flow of a steam/air mixture therethrough to the primary combustion zone of the combustion chamber.

The gas turbine engine according to any preceding clause, wherein at least one of the outer casing or the inner casing includes a plurality of turbine airflow openings providing a flow of cooling air or a flow of a steam/air mixture therethrough to the turbine section.

The gas turbine engine according to any preceding clause, wherein the swirler assembly provides a flow of an air/fuel/steam mixture into the primary combustion zone of the combustion chamber.

The gas turbine engine according to any preceding clause, wherein a total amount of steam flow ($Wsteam_{total}$) includes a steam provided from the cowl into the plenum ($Wsteam_{cowl}$) plus the amount of steam provided from the cowl into the outer flow passage ($Wsteam_{outer}$) plus the amount of steam provided from the cowl into the inner flow passage ($Wsteam_{inner}$).

The gas turbine engine according to any preceding clause, wherein a total amount of air provided to the combustor from the compressor section is Wa3, and a water-to-air ratio ($WAR_{total}$) is $Wsteam_{total}/Wa3$, and may have a range from 0.1 percent to sixty percent.

The gas turbine engine according to any preceding clause, wherein a ratio the total amount of steam provided to the plenum ($Wsteam_{cowl}$) to the total amount of steam provided to the combustor ($Wsteam_{total}$) is $Wsteam_{cowl}/Wsteam_{total}$ and may have a range from zero percent to fifty percent.

The gas turbine engine according to any preceding clause, wherein a ratio of the steam provided to the outer flow passage ($Wsteam_{outer}$) to the total steam provided to the combustor ($Wsteam_{total}$) is $Wsteam_{outer}/Wsteam_{total}$ and may have a range from 0.1 percent to one-hundred percent.

The gas turbine engine according to any preceding clause, wherein a ratio of the steam provided to the inner flow passage ($Wsteam_{inner}$) to the total steam provided to the combustor ($Wsteam_{total}$) is $Wsteam_{inner}/Wsteam_{total}$ and may have a range from 0.1 percent to one-hundred percent.

The gas turbine engine according to any preceding clause, wherein a water-to-air ratio ($WAR_{cowl}$) of the steam provided to the plenum ($Wsteam_{cowl}$) to the total amount of air provided to the combustor (Wa3) is $Wsteam_{cowl}/Wa3$, and may have a range from zero percent to thirty percent.

The gas turbine engine according to any preceding clause, wherein a water-to-air ratio ($WAR_{outer}$) of the steam provided to the outer flow passage ($Wsteam_{outer}$) to the total amount of air provided to the combustor (Wa3) is $Wsteam_{outer}/Wa3$, and may have a range from 0.1 percent to sixty percent.

The gas turbine engine according to any preceding clause, wherein a water-to-air ratio ($WAR_{inner}$) of the steam provided to the inner flow passage ($Wsteam_{inner}$) to the total amount of air provided to the combustor (Wa3) is $Wsteam_{inner}/Wa3$, and may have a range from 0.1 percent to sixty percent.

The gas turbine engine according to any preceding clause, wherein a ratio of the steam provided to the plenum ($Wsteam_{cowl}$) to the amount of steam flowing through the swirler assembly ($Wsteam_{swirler}$) is $Wsteam_{swirler}/Wsteam_{cowl}$, and may have a range from five percent to ninety-five percent.

The gas turbine engine according to any preceding clause, wherein a ratio of the steam provided to the plenum ($Wsteam_{cowl}$) to the amount of steam flowing through the dome structure ($Wsteam_{dome}$) is $Wsteam_{dome}=1-Wsteam_{swirler}$.

The gas turbine engine according to any preceding clause, wherein a total amount of steam provided to the primary combustion zone of the combustion chamber ($Wsteam_{prim\ zone}$) is the total amount of steam provided through the swirler assemblies ($Wsteam_{swirler}$), plus the total amount of steam provided through the dome ($Wsteam_{dome}$), plus the total amount of steam provided through the primary zone cooling openings ($Wsteam_{cooling\ prim}$), The gas turbine engine according to any preceding clause, wherein a ratio of the total amount of steam provided to the primary combustion zone ($Wsteam_{prim\ zone}$) to the total amount of steam ($Wsteam_{total}$) injected into the combustor is $Wsteam_{prim\ zone}/Wsteam_{total}$, and may have a range from zero percent to sixty percent.

The gas turbine engine according to any preceding clause, wherein a ratio of the total amount of steam provided to the dilution zone and to the secondary combustion zone ($Wsteam_{secondary\ zone}$) to the total amount of steam ($Wsteam_{total}$) injected into the combustor is $Wsteam_{secondary\ zone}/Wsteam_{total}$, and may have a range from zero percent to one-hundred percent.

The gas turbine engine according to any preceding clause, wherein a water-to air ratio of amount of the steam provided to the turbine section ($Wsteam_{turbine}$) to the total airflow in the combustor (Wa3) is $Wsteam_{turbine}/Wa3$ and may have a range from zero percent to sixty percent.

A combustor for an aircraft gas turbine engine, the combustor including a dome structure, a swirler assembly connected to the dome structure, and a cowl connected to the dome structure and defining a plenum between the dome structure and the cowl, and surrounding the swirler assembly, the cowl including an airflow opening through an upstream wall portion of the cowl for providing a flow of compressed air into the plenum, wherein the cowl includes a cowl steam channel therewithin and a plurality of steam injection nozzles that provide a flow of steam from the cowl steam channel into the plenum, wherein the cowl includes a cowl outer wall portion extending downstream from an outer end of the upstream wall portion and a cowl inner wall portion extending downstream from an inner end of the upstream wall portion, and the cowl steam channel includes at least one of an outer steam manifold within the cowl outer wall portion or an inner steam manifold within the cowl inner wall portion, and wherein the plurality of steam injection nozzles includes at least one outer steam injection nozzle providing a flow of steam into the plenum from the outer steam manifold or at least one inner steam injection nozzle providing a flow of steam into the plenum from the inner steam manifold.

A combustor for an aircraft gas turbine engine, the combustor including a dome structure, a swirler assembly connected to the dome structure, and a cowl connected to the dome structure and defining a plenum between the dome structure and the cowl, and surrounding the swirler assembly, the cowl including an airflow opening through an upstream wall portion of the cowl for providing a flow of compressed air into the plenum, wherein the cowl includes a cowl steam channel therewithin and a plurality of steam injection nozzles that provide a flow of steam from the cowl steam channel into the plenum, wherein the cowl includes a cowl outer wall portion extending downstream from an outer end of the upstream wall portion and a cowl inner wall portion extending downstream from an inner end of the upstream wall portion, and the cowl steam channel includes at least one of an outer steam manifold within the cowl outer wall portion or an inner steam manifold within the cowl inner wall portion, and wherein the cowl includes at least one of a first rib on a first circumferential side of the upstream wall portion and extending between the cowl outer wall portion and the cowl inner wall portion, or a second rib on a second circumferential side of the upstream wall portion and extending between the cowl outer wall portion and the cowl inner wall portion, the cowl steam channel extending within at least one of the first rib or the second rib, and the plurality of steam injection nozzles being provided in at least one of the first rib or the second rib and providing the flow of steam therethrough into the plenum.

A combustor for an aircraft gas turbine engine, the combustor including a dome structure, a swirler assembly connected to the dome structure, and a cowl connected to the dome structure and defining a plenum between the dome structure and the cowl, and surrounding the swirler assembly, the cowl including an airflow opening through an upstream wall portion of the cowl for providing a flow of compressed air into the plenum, wherein the cowl includes a cowl steam channel therewithin and a plurality of steam injection nozzles that provide a flow of steam from the cowl steam channel into the plenum, wherein the cowl includes a cowl outer wall portion extending downstream from an outer end of the upstream wall portion and a cowl inner wall portion extending downstream from an inner end of the upstream wall portion, and the cowl steam channel includes at least one of an outer steam manifold within the cowl outer wall portion or an inner steam manifold within the cowl inner wall portion, and wherein the combustor further comprises a second swirler assembly connected to the dome structure circumferentially adjacent to the swirler assembly, and the cowl further includes a second upstream wall portion, a second outer wall portion, and a second inner wall portion and defines a second plenum between the dome structure and the cowl and surrounding the second swirler assembly, the cowl including a second airflow opening through the second upstream wall portion for providing a flow of compressed air into the second plenum, and the cowl further includes a rib arranged between the upstream wall portion and the second upstream wall portion, the cowl steam channel extending through the rib and the plurality of steam injection nozzles including at least one rib steam injection nozzle included in the rib.

The combustor according to the preceding clause, wherein the at least one rib steam injection nozzle includes at least one first side steam injection nozzle arranged on a first side of the rib and providing a flow of steam into the plenum, and at least one second side steam injection nozzle arranged on a second side of the rib opposite the first side of the rib and providing a flow of steam into the second plenum.

The combustor according to any preceding clause, wherein the at least one first side steam injection nozzle and the at least one second side steam injection nozzle are radially offset from one another in a radial direction with respect to a combustor centerline axis.

A combustor for an aircraft gas turbine engine, the combustor including a dome structure, a swirler assembly connected to the dome structure, and a cowl connected to the dome structure and defining a plenum between the dome structure and the cowl, and surrounding the swirler assembly, the cowl including an airflow opening through an upstream wall portion of the cowl for providing a flow of compressed air into the plenum, wherein the cowl includes a cowl steam channel therewithin and a plurality of steam injection nozzles that provide a flow of steam from the cowl steam channel into the plenum, wherein the cowl includes a cowl outer wall portion extending downstream from an outer end of the upstream wall portion and a cowl inner wall portion extending downstream from an inner end of the upstream wall portion, and the cowl steam channel includes at least one of an outer steam manifold within the cowl outer wall portion or an inner steam manifold within the cowl inner wall portion, wherein the cowl includes at least one of a first rib on a first circumferential side of the upstream wall portion and extending between the cowl outer wall portion and the cowl inner wall portion, or a second rib on a second circumferential side of the upstream wall portion and extending between the cowl outer wall portion and the cowl inner wall portion, the cowl steam channel extending within at least one of the first rib or the second rib, and the plurality of steam injection nozzles being provided in at least one of the first rib or the second rib and providing the flow of steam therethrough into the plenum, and wherein at least one of the first rib or the second rib includes an outer longitudinal rib portion extending at least partially along the cowl outer wall portion, and an inner longitudinal rib portion extending at least partially along the cowl inner wall portion, at least one of the outer longitudinal rib portion or the inner longitudinal rib portion including, as part of the cowl steam channel, a steam channel extending within the outer longitudinal rib portion or the inner longitudinal rib portion, and at least one of the outer longitudinal rib portion or the inner longitudinal rib portion includes at least one steam injection nozzle arranged to inject steam into the plenum.

A combustor for an aircraft gas turbine engine, the combustor including a dome structure, a swirler assembly connected to the dome structure, and a cowl connected to the dome structure and defining a plenum between the dome structure and the cowl, and surrounding the swirler assembly, the cowl including an airflow opening through an upstream wall portion of the cowl for providing a flow of compressed air into the plenum, wherein the cowl includes a cowl steam channel therewithin and a plurality of steam injection nozzles that provide a flow of steam from the cowl steam channel into the plenum, wherein the combustor further includes an outer liner connected to the dome structure, an inner liner connected to the dome structure, wherein the outer liner, the inner liner, and the dome structure define a combustion chamber, an outer casing arranged radially outward of the outer liner, the dome structure, and the cowl, and defining an outer airflow passage between the outer casing and the outer liner, an inner casing arranged radially inward of the inner liner, the dome structure and the cowl, and defining an inner airflow passage between the inner casing and the inner liner, and a diffusor connecting an upstream end of the outer casing and an upstream end of the inner casing, a pressure plenum being defined between the diffusor, the upstream end of the outer casing, and the upstream end of the inner casing, the pressure plenum being in fluid communication with the outer airflow passage and with the inner airflow passage, the diffusor providing a flow of compressed air therethrough into the pressure plenum, and wherein the cowl includes a cowl outer wall portion extending downstream from an outer end of the upstream wall portion and a cowl inner wall portion extending downstream from an inner end of the upstream wall portion, and the cowl steam channel includes an outer steam manifold within the cowl outer wall portion, an inner steam manifold within the cowl inner wall portion, and a connecting steam channel connecting the outer steam manifold and the inner steam manifold, the plurality of steam injection nozzles includes (a) at least one outer steam injection nozzle providing a flow of steam into the plenum from the outer steam manifold, (b) at least one inner steam injection nozzle providing a flow of steam into the plenum from the inner steam manifold, (c) at least one outer airflow passage steam injection nozzle arranged to provide a flow of steam from the outer steam manifold into at least one of the pressure plenum or the outer airflow passage, and (d) at least one inner airflow passage steam injection nozzle arranged to provide a flow of steam from the inner steam manifold into at least one of the pressure plenum or the inner airflow passage.

A combustor for an aircraft gas turbine engine, the combustor including a dome structure, a swirler assembly connected to the dome structure, and a cowl connected to the dome structure and defining a plenum between the dome structure and the cowl, and surrounding the swirler assembly, the cowl including an airflow opening through an upstream wall portion of the cowl for providing a flow of compressed air into the plenum, wherein the cowl includes a cowl steam channel therewithin and a plurality of steam injection nozzles that provide a flow of steam from the cowl steam channel into the plenum, wherein the combustor further includes an outer liner connected to the dome structure, an inner liner connected to the dome structure, wherein the outer liner, the inner liner, and the dome structure define a combustion chamber, an outer casing arranged radially outward of the outer liner, the dome structure, and the cowl, and defining an outer airflow passage between the outer casing and the outer liner, an inner casing arranged radially inward of the inner liner, the dome structure and the cowl, and defining an inner airflow passage between the inner casing and the inner liner, and a diffusor connecting an upstream end of the outer casing and an upstream end of the inner casing, a pressure plenum being defined between the diffusor, the upstream end of the outer casing, and the upstream end of the inner casing, the pressure plenum being in fluid communication with the outer airflow passage and with the inner airflow passage, the diffusor providing a flow of compressed air therethrough into the pressure plenum, and wherein the cowl further includes at least one cowl mounting arm mounting the cowl to one of the outer casing or the inner casing, the at least one cowl mounting arm including a mounting arm steam channel in fluid communication with the cowl steam channel, and the at least one cowl mounting arm including at least one mounting arm steam injection nozzle providing a flow of steam from the mounting arm steam channel into at least one of the pressure plenum, the outer airflow passage, or the inner airflow passage.

A combustor for an aircraft gas turbine engine, the combustor including a dome structure, a swirler assembly connected to the dome structure, and a cowl connected to the dome structure and defining a plenum between the dome structure and the cowl, and surrounding the swirler assembly, the cowl including an airflow opening through an upstream wall portion of the cowl for providing a flow of compressed air into the plenum, wherein the cowl includes a cowl steam channel therewithin, wherein the combustor further includes an outer liner connected to the dome structure, an inner liner connected to the dome structure, wherein the outer liner, the inner liner, and the dome structure define a combustion chamber, an outer casing arranged radially outward of the outer liner, the dome structure, and the cowl, and defining an outer airflow passage between the outer casing and the outer liner, an inner casing arranged radially inward of the inner liner, the dome structure and the cowl, and defining an inner airflow passage between the inner casing and the inner liner, and wherein the cowl further includes (a) at least one outer airflow passage steam injection extension in fluid communication with the cowl steam channel and extending from the cowl into the outer flow passage and including at least one steam injection nozzle for injecting steam into the outer flow passage, and (b) at least one inner airflow passage steam injection extension in fluid communication with the cowl steam channel and extending from the cowl into the inner flow passage and including at least one steam injection nozzle for injecting steam into the inner flow passage.

A gas turbine engine for an aircraft, the gas turbine engine including a compressor section, a combustor arranged in serial flow relationship with the compressor section, a turbine section arranged in serial flow relationship with the combustor, a steam turbine arranged in serial flow relationship with the turbine section, an exhaust section arranged in serial flow relationship with the steam turbine, and a steam generation system arranged at least partially within the exhaust section, the steam generation system being configured to generate steam, deliver a flow of steam to the steam turbine, and to provide a flow of steam to the combustor, wherein the combustor includes (a) a dome structure, (b) a swirler assembly connected to the dome structure, and (c) a cowl connected to the dome structure and defining a plenum between the dome structure and the cowl, and surrounding the swirler assembly, the cowl including an airflow opening through an upstream wall portion of the cowl for providing a flow of compressed air from the compressor section into the plenum, wherein the cowl includes a cowl steam channel therewithin and a plurality of steam injection nozzles that provide a flow of steam provided by the steam generation system from the cowl steam channel into the plenum, wherein the steam generation system includes a boiler arranged in the exhaust section, a condenser, a water/exhaust separator, a water storage tank arranged to receive water from the water/exhaust separator and arranged to provide a supply of water to the boiler, and a steam supply line that provides a flow of steam to the steam turbine, a combustor steam supply line arranged to provide a flow of steam from the steam generation system to the combustor, and wherein the cowl includes a cowl outer wall portion extending downstream from an outer end of the upstream wall portion and a cowl inner wall portion extending downstream from an inner end of the upstream wall portion, and the cowl steam channel includes at least one of an outer steam manifold within the cowl outer wall portion or an inner steam manifold within the cowl inner wall portion, and wherein the plurality of steam injection nozzles includes at least one outer steam injection nozzle providing a flow of steam into the plenum from the outer steam manifold or at least one inner steam injection nozzle providing a flow of steam into the plenum from the inner steam manifold.

A gas turbine engine for an aircraft, the gas turbine engine including a compressor section, a combustor arranged in serial flow relationship with the compressor section, a turbine section arranged in serial flow relationship with the combustor, a steam turbine arranged in serial flow relationship with the turbine section, an exhaust section arranged in serial flow relationship with the steam turbine, and a steam generation system arranged at least partially within the exhaust section, the steam generation system being configured to generate steam, deliver a flow of steam to the steam turbine, and to provide a flow of steam to the combustor, wherein the combustor includes (a) a dome structure, (b) a swirler assembly connected to the dome structure, and (c) a cowl connected to the dome structure and defining a plenum between the dome structure and the cowl, and surrounding the swirler assembly, the cowl including an airflow opening through an upstream wall portion of the cowl for providing a flow of compressed air from the compressor section into the plenum, wherein the cowl includes a cowl steam channel therewithin and a plurality of steam injection nozzles that provide a flow of steam provided by the steam generation system from the cowl steam channel into the plenum, wherein the combustor further includes an outer liner connected to the dome structure, an inner liner connected to the dome structure, wherein the outer liner, the inner liner, and the dome structure define a combustion chamber, an outer casing arranged radially outward of the outer liner, the dome structure, and the cowl, and defining an outer airflow passage between the outer casing and the outer liner, an inner casing arranged radially inward of the inner liner, the dome structure and the cowl, and defining an inner airflow passage between the inner casing and the inner liner, and a diffusor connecting an upstream end of the outer casing and an upstream end of the inner casing, a pressure plenum being defined between the diffusor, the upstream end of the outer casing, and the upstream end of the inner casing, the pressure plenum being in fluid communication with the outer airflow passage and with the inner airflow passage, the diffusor providing a flow of compressed air therethrough into the pressure plenum, and wherein the cowl includes a cowl outer wall portion extending downstream from an outer end of the upstream wall portion and a cowl inner wall portion extending downstream from an inner end of the upstream wall portion, and the cowl steam channel includes an outer steam manifold within the cowl outer wall portion, an inner steam manifold within the cowl inner wall portion, and a connecting steam channel connecting the outer steam manifold and the inner steam manifold, the plurality of steam injection nozzles includes (a) at least one outer steam injection nozzle providing a flow of steam into the plenum from the outer steam manifold, (b) at least one inner steam injection nozzle providing a flow of steam into the plenum from the inner steam manifold, (c) at least one outer airflow passage steam injection nozzle arranged to provide a flow of steam from the outer steam manifold into at least one of the pressure plenum or the outer airflow passage, and (d) at least one inner airflow passage steam injection nozzle arranged to provide a flow of steam from the inner steam manifold into at least one of the pressure plenum or the inner airflow passage.

A gas turbine engine for an aircraft, the gas turbine engine including a compressor section, a combustor arranged in serial flow relationship with the compressor section, a turbine section arranged in serial flow relationship with the combustor, a steam turbine arranged in serial flow relationship with the turbine section, an exhaust section arranged in serial flow relationship with the steam turbine, and a steam generation system arranged at least partially within the exhaust section, the steam generation system being configured to generate steam, deliver a flow of steam to the steam turbine, and to provide a flow of steam to the combustor, wherein the combustor includes (a) a dome structure, (b) a swirler assembly connected to the dome structure, and (c) a cowl connected to the dome structure and defining a plenum between the dome structure and the cowl, and surrounding the swirler assembly, the cowl including an airflow opening through an upstream wall portion of the cowl for providing a flow of compressed air from the compressor section into the plenum, wherein the cowl includes a cowl steam channel therewithin and a plurality of steam injection nozzles that provide a flow of steam provided by the steam generation system from the cowl steam channel into the plenum, and wherein the combustor further comprises a second swirler assembly connected to the dome structure circumferentially adjacent to the swirler assembly, and the cowl further includes a second upstream wall portion, a second outer wall portion, and a second inner wall portion and defines a second plenum between the dome structure and the cowl, and surrounding the second swirler assembly, the cowl including a second airflow opening through the second upstream wall portion for providing a flow of compressed air into the second plenum, and the cowl further includes a rib arranged between the upstream wall portion and the second upstream wall portion, the cowl steam channel extending through the rib and the plurality of steam injection nozzles including at least one rib steam injection nozzle included in the rib.

The gas turbine engine according to the preceding clause, wherein the at least one rib steam injection nozzle includes at least one first side steam injection nozzle arranged on a first side of the rib and providing a flow of steam into the plenum, and at least one second side steam injection nozzle arranged on a second side of the rib opposite the first side of the rib and providing a flow of steam into the second plenum.

Although the foregoing description is directed to some exemplary embodiments of the present disclosure, other variations and modifications will be apparent to those skilled in the art, and may be made without departing from the spirit or the scope of the disclosure. Moreover, features described in connection with one embodiment of the present disclosure may be used in conjunction with other embodiments, even if not explicitly stated above.

We claim:

1. A combustor for an aircraft gas turbine engine, the combustor comprising:
    a dome structure;
    a swirler assembly connected to the dome structure; and
    a cowl connected to the dome structure and defining a plenum between the dome structure and the cowl, and surrounding the swirler assembly, the cowl including an airflow opening through an upstream wall portion of the cowl for providing a flow of compressed air into the plenum, wherein the cowl includes a cowl steam channel therewithin and a plurality of steam injection nozzles that provide a flow of steam from the cowl steam channel into the plenum.

2. The combustor according to claim 1, wherein the cowl further includes at least one cowl mounting arm mounting the cowl to a combustor casing, the at least one cowl mounting arm including a mounting arm steam channel in fluid communication with the cowl steam channel.

3. The combustor according to claim 1, wherein the cowl includes a cowl outer wall portion extending downstream from an outer end of the upstream wall portion and a cowl inner wall portion extending downstream from an inner end of the upstream wall portion, and the cowl steam channel includes at least one of an outer steam manifold within the cowl outer wall portion or an inner steam manifold within the cowl inner wall portion.

4. The combustor according to claim 3, wherein the plurality of steam injection nozzles includes at least one outer steam injection nozzle providing a flow of steam into the plenum from the outer steam manifold or at least one inner steam injection nozzle providing a flow of steam into the plenum from the inner steam manifold.

5. The combustor according to claim 3, wherein the cowl includes at least one of a first rib on a first circumferential side of the upstream wall portion and extending between the cowl outer wall portion and the cowl inner wall portion, or a second rib on a second circumferential side of the upstream wall portion and extending between the cowl outer wall portion and the cowl inner wall portion, the cowl steam channel extending within at least one of the first rib or the second rib, and the plurality of steam injection nozzles being provided in at least one of the first rib or the second rib and providing the flow of steam therethrough into the plenum.

6. The combustor according to claim 5, wherein the plurality of steam injection nozzles includes at least one first rib steam injection nozzle in the first rib providing a flow of steam into the plenum or at least one second rib steam injection nozzle in the second rib providing a flow of steam into the plenum.

7. The combustor according to claim 5, wherein at least one of the first rib or the second rib includes an outer longitudinal rib portion extending at least partially along the cowl outer wall portion, and an inner longitudinal rib portion extending at least partially along the cowl inner wall portion, at least one of the outer longitudinal rib portion or the inner longitudinal rib portion including, as part of the cowl steam channel, a steam channel extending within the outer longitudinal rib portion or the inner longitudinal rib portion, and at least one of the outer longitudinal rib portion or the inner longitudinal rib portion includes at least one steam injection nozzle arranged to inject steam into the plenum.

8. The combustor according to claim 3, wherein the combustor further comprises a second swirler assembly connected to the dome structure circumferentially adjacent to the swirler assembly, and the cowl further includes a second upstream wall portion, a second outer wall portion, and a second inner wall portion and defines a second plenum between the dome structure and the cowl and surrounding the second swirler assembly, the cowl including a second airflow opening through the second upstream wall portion for providing a flow of compressed air into the second plenum, and the cowl further includes a rib arranged between the upstream wall portion and the second upstream wall portion, the cowl steam channel extending through the rib and the plurality of steam injection nozzles including at least one rib steam injection nozzle included in the rib.

9. The combustor according to claim 8, wherein the at least one rib steam injection nozzle includes at least one first side steam injection nozzle arranged on a first side of the rib and providing a flow of steam into the plenum, and at least one second side steam injection nozzle arranged on a second side of the rib opposite the first side of the rib and providing a flow of steam into the second plenum.

10. The combustor according to claim 9, wherein the at least one first side steam injection nozzle and the at least one second side steam injection nozzle are radially offset from one another in a radial direction with respect to a combustor centerline axis.

11. The combustor according to claim 1, wherein the combustor further comprises:
- an outer liner connected to the dome structure;
- an inner liner connected to the dome structure, wherein the outer liner, the inner liner, and the dome structure define a combustion chamber;
- an outer casing arranged radially outward of the outer liner, the dome structure, and the cowl, and defining an outer airflow passage between the outer casing and the outer liner;
- an inner casing arranged radially inward of the inner liner, the dome structure and the cowl, and defining an inner airflow passage between the inner casing and the inner liner; and
- a diffusor connecting an upstream end of the outer casing and an upstream end of the inner casing, a pressure plenum being defined between the diffusor, the upstream end of the outer casing, and the upstream end of the inner casing, the pressure plenum being in fluid communication with the outer airflow passage and with the inner airflow passage, the diffusor providing a flow of compressed air therethrough into the pressure plenum.

12. The combustor according to claim 11, wherein the cowl includes a cowl outer wall portion extending downstream from an outer end of the upstream wall portion and a cowl inner wall portion extending downstream from an inner end of the upstream wall portion, and the cowl steam channel includes an outer steam manifold within the cowl outer wall portion, an inner steam manifold within the cowl inner wall portion, and a connecting steam channel connecting the outer steam manifold and the inner steam manifold, the plurality of steam injection nozzles includes (a) at least one outer steam injection nozzle providing a flow of steam into the plenum from the outer steam manifold, (b) at least one inner steam injection nozzle providing a flow of steam into the plenum from the inner steam manifold, (c) at least one outer airflow passage steam injection nozzle arranged to provide a flow of steam from the outer steam manifold into at least one of the pressure plenum or the outer airflow passage, and (d) at least one inner airflow passage steam injection nozzle arranged to provide a flow of steam from the inner steam manifold into at least one of the pressure plenum or the inner airflow passage.

13. The combustor according to claim 11, wherein the cowl further includes at least one cowl mounting arm mounting the cowl to one of the outer casing or the inner casing, the at least one cowl mounting arm including a mounting arm steam channel in fluid communication with the cowl steam channel, and the at least one cowl mounting arm including at least one mounting arm steam injection nozzle providing a flow of steam from the mounting arm steam channel into at least one of the pressure plenum, the outer airflow passage, or the inner airflow passage.

14. A gas turbine engine for an aircraft, the gas turbine engine comprising:
- a compressor section;
- a combustor arranged in serial flow relationship with the compressor section;
- a turbine section arranged in serial flow relationship with the combustor;
- a steam turbine arranged in serial flow relationship with the turbine section;
- an exhaust section arranged in serial flow relationship with the steam turbine; and
- a steam generation system arranged at least partially within the exhaust section, the steam generation system being configured to generate steam, deliver a flow of steam to the steam turbine, and to provide a flow of steam to the combustor,
- wherein the combustor includes (a) a dome structure, (b) a swirler assembly connected to the dome structure, and (c) a cowl connected to the dome structure and defining a plenum between the dome structure and the cowl, and surrounding the swirler assembly, the cowl including an airflow opening through an upstream wall portion of the cowl for providing a flow of compressed air from the compressor section into the plenum, wherein the cowl includes a cowl steam channel therewithin and a plurality of steam injection nozzles that provide a flow of steam provided by the steam generation system from the cowl steam channel into the plenum.

15. The gas turbine engine according to claim 14, wherein the steam generation system includes:
- a boiler arranged in the exhaust section;
- a condenser;
- a water/exhaust separator;
- a water storage tank arranged to receive water from the water/exhaust separator and arranged to provide a supply of water to the boiler; and
- a steam supply line that provides a flow of steam to the steam turbine,
- a combustor steam supply line arranged to provide a flow of steam from the steam generation system to the combustor.

16. The gas turbine engine according to claim 14, wherein the cowl includes a cowl outer wall portion extending downstream from an outer end of the upstream wall portion and a cowl inner wall portion extending downstream from an inner end of the upstream wall portion, and the cowl steam channel includes at least one of an outer steam manifold within the cowl outer wall portion or an inner steam manifold within the cowl inner wall portion, and wherein the plurality of steam injection nozzles includes at least one outer steam injection nozzle providing a flow of steam into the plenum from the outer steam manifold or at least one inner steam injection nozzle providing a flow of steam into the plenum from the inner steam manifold.

17. The gas turbine engine according to claim 14, wherein the combustor further comprises:
- an outer liner connected to the dome structure;
- an inner liner connected to the dome structure, wherein the outer liner, the inner liner, and the dome structure define a combustion chamber;
- an outer casing arranged radially outward of the outer liner, the dome structure, and the cowl, and defining an outer airflow passage between the outer casing and the outer liner;
- an inner casing arranged radially inward of the inner liner, the dome structure and the cowl, and defining an inner airflow passage between the inner casing and the inner liner; and
- a diffusor connecting an upstream end of the outer casing and an upstream end of the inner casing, a pressure plenum being defined between the diffusor, the upstream end of the outer casing, and the upstream end of the inner casing, the pressure plenum being in fluid communication with the outer airflow passage and with the inner airflow passage, the diffusor providing a flow of compressed air therethrough into the pressure plenum.

18. The gas turbine engine according to claim 17, wherein the cowl includes a cowl outer wall portion extending downstream from an outer end of the upstream wall portion and a cowl inner wall portion extending downstream from an inner end of the upstream wall portion, and the cowl steam channel includes an outer steam manifold within the cowl outer wall portion, an inner steam manifold within the cowl inner wall portion, and a connecting steam channel connecting the outer steam manifold and the inner steam manifold, the plurality of steam injection nozzles includes (a) at least one outer steam injection nozzle providing a flow of steam into the plenum from the outer steam manifold, (b) at least one inner steam injection nozzle providing a flow of steam into the plenum from the inner steam manifold, (c) at least one outer airflow passage steam injection nozzle arranged to provide a flow of steam from the outer steam manifold into at least one of the pressure plenum or the outer airflow passage, and (d) at least one inner airflow passage steam injection nozzle arranged to provide a flow of steam from the inner steam manifold into at least one of the pressure plenum or the inner airflow passage.

19. The gas turbine engine according to claim 14, wherein the combustor further comprises a second swirler assembly connected to the dome structure circumferentially adjacent to the swirler assembly, and the cowl further includes a second upstream wall portion, a second outer wall portion, and a second inner wall portion and defines a second plenum between the dome structure and the cowl, and surrounding the second swirler assembly, the cowl including a second airflow opening through the second upstream wall portion for providing a flow of compressed air into the second plenum, and the cowl further includes a rib arranged between the upstream wall portion and the second upstream wall portion, the cowl steam channel extending through the rib and the plurality of steam injection nozzles including at least one rib steam injection nozzle included in the rib.

20. The gas turbine engine according to claim 19, wherein the at least one rib steam injection nozzle includes at least one first side steam injection nozzle arranged on a first side of the rib and providing a flow of steam into the plenum, and at least one second side steam injection nozzle arranged on a second side of the rib opposite the first side of the rib and providing a flow of steam into the second plenum.

* * * * *